United States Patent
Haneda et al.

(10) Patent No.: US 11,567,529 B2
(45) Date of Patent: Jan. 31, 2023

(54) REAL-TIME CLOCK DEVICE AND ELECTRONIC APPARATUS

(71) Applicant: Seiko Epson Corporation, Toyko (JP)

(72) Inventors: Hideo Haneda, Matsumoto (JP); Yasuhiro Sudo, Chino (JP); Akio Tsutsumi, Chino (JP)

(73) Assignee: SEIKO EPSON CORPORATION

( * ) Notice: Subject to any disclaimer, the term of this patent is extended or adjusted under 35 U.S.C. 154(b) by 219 days.

(21) Appl. No.: 17/131,846

(22) Filed: Dec. 23, 2020

(65) Prior Publication Data

US 2021/0200260 A1 Jul. 1, 2021

(30) Foreign Application Priority Data

Dec. 25, 2019 (JP) .............................. JP2019-234107

(51) Int. Cl.
*G06F 1/14* (2006.01)
*G04F 10/00* (2006.01)
*G04F 5/00* (2006.01)

(52) U.S. Cl.
CPC .................. *G06F 1/14* (2013.01); *G04F 5/00* (2013.01); *G04F 10/005* (2013.01)

(58) Field of Classification Search
CPC . G06F 1/14; G04F 5/00; G04F 10/005; G04F 5/063
See application file for complete search history.

(56) References Cited

U.S. PATENT DOCUMENTS

| | | | |
|---|---|---|---|
| 9,068,896 B2 * | 6/2015 | Yun | G01K 7/32 |
| 2011/0169673 A1 * | 7/2011 | Henzler | G04F 10/005 341/141 |
| 2018/0088536 A1 * | 3/2018 | Kurashina | H03L 7/18 |

FOREIGN PATENT DOCUMENTS

| | | |
|---|---|---|
| CN | 101799658 A | 8/2010 |
| JP | 2013-055588 A | 3/2013 |

* cited by examiner

*Primary Examiner* — Vineeta S Panwalkar
(74) *Attorney, Agent, or Firm* — Harness, Dickey & Pierce, P.L.C.

(57) ABSTRACT

A real-time clock device includes a resonator, a clock signal generation circuit, a time-counting circuit, a terminal, and a time-to-digital conversion circuit. The clock signal generation circuit outputs a time-counting clock signal based on an oscillation clock signal. The time-counting circuit generates time-counting data based on the time-counting clock signal. An external signal is input to the terminal. The time-to-digital conversion circuit measures a time difference between a transition timing of a first signal based on the external signal and a transition timing of a second signal based on the oscillation clock signal or the time-counting clock signal with a resolution higher than a time-counting resolution of the time-counting circuit, and obtains time difference information corresponding to the time difference.

14 Claims, 17 Drawing Sheets

REAL-TIME CLOCK DEVICE AND ELECTRONIC APPARATUS

The present application is based on, and claims priority from JP Application Serial Number 2019-234107, filed Dec. 25, 2019, the disclosure of which is hereby incorporated by reference herein in its entirety.

BACKGROUND

1. Technical Field

The present disclosure relates to a real-time clock device, an electronic apparatus, and the like.

2. Related Art

There is known a real-time clock device that performs time-counting based on an oscillation clock signal to generate time information. JP-A-2013-55588 discloses a time control device including the real-time clock device. The time control device of JP-A-2013-55588 detects an error between a first clock signal generated based on information received from a satellite and a second clock signal generated by an RTC, and adjusts the second clock signal when the detected error is larger than a value set in advance. At this time, the time control device detects the error between the first clock signal and the second clock signal using a counter.

In JP-A-2013-55588, the error between the first clock signal and the second clock signal is detected by using the counter. Therefore, the accuracy of the second clock signal adjusted based on the error is limited by a time resolution of the counter. Since the RTC performs the time-counting based on the second clock signal, time-counting accuracy thereof is limited by the time resolution of the counter. Therefore, even though there is a need for highly accurate time information, such as generation of time information having a resolution higher than the time resolution of the counter, there is a problem that the highly accurate time information cannot be realized.

SUMMARY

One aspect of the present disclosure relates to a real-time clock device including a resonator, a clock signal generation circuit that has an oscillation circuit causing the resonator to oscillate to generate an oscillation clock signal, and that outputs a time-counting clock signal based on the oscillation clock signal, a time-counting circuit that generates time-counting data based on the time-counting clock signal, an external signal input terminal to which an external signal is input, and a time-to-digital conversion circuit that measures a time difference between a transition timing of a first signal based on the external signal input from the external signal input terminal and a transition timing of a second signal based on the oscillation clock signal or the time-counting clock signal with a resolution higher than a time-counting resolution of the time-counting circuit, and obtains time difference information corresponding to the time difference.

DESCRIPTION OF EXEMPLARY EMBODIMENTS

Hereinafter, a preferred exemplary embodiment of the present disclosure will be described in detail. The present exemplary embodiment described below does not unreasonably limit contents described in the appended claims, and all configurations to be described in the present exemplary embodiment are not necessarily essential constituent elements.

1. First Configuration Example

Figure 1:
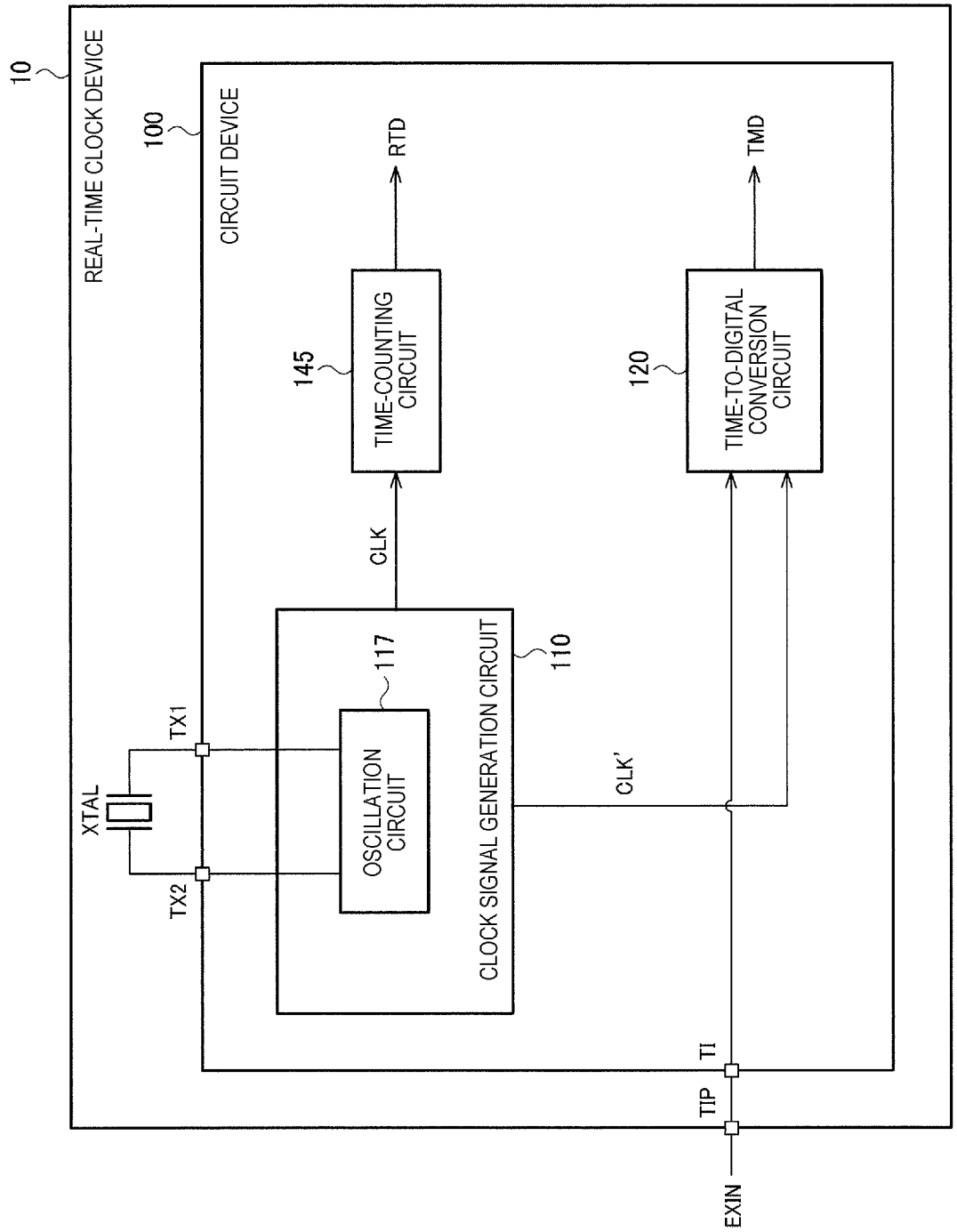
FIG. 1 is a first configuration example of a real-time clock device and a circuit device.

FIG. 1 is a first configuration example of a real-time clock device 10 and a circuit device 100. The real-time clock device 10 includes a circuit device 100, a resonator XTAL, and a terminal TIP. The TIP is an external signal input terminal.

The circuit device 100 generates time-counting data RTD and performs time measurement with a resolution higher than a time resolution of the time-counting data RTD to realize a highly accurate real-time clock device. The circuit device 100 is an integrated circuit device called an integrated circuit (IC). The circuit device 100 is an IC manufactured by a semiconductor process and is a semiconductor chip in which circuit elements are formed on a semiconductor substrate.

The resonator XTAL is an element that generates mechanical vibration by an electric signal. The resonator XTAL can be realized by a resonator element such as a quartz crystal resonator element. For example, the resonator XTAL can be realized by a quartz crystal resonator element or the like that performs thickness-shear vibration, such as an AT cut or an SC cut.

The resonator XTAL of the present exemplary embodiment can be realized by various resonator elements such as a resonator element other than the thickness-shear vibration type or a piezoelectric resonator element formed of a material other a quartz crystal. For example, a SAW resonator or a MEMS resonator as a silicon resonator formed by using a silicon substrate may be employed as the resonator XTAL. The SAW is an abbreviation for surface acoustic wave, and the MEMS is an abbreviation for micro electro mechanical systems.

The circuit device 100 and the resonator XTAL are electrically coupled, and the circuit device 100 and the resonator XTAL are accommodated in a package, for example. The package is configured of a container in which the circuit device 100 and the resonator XTAL are accommodated, and a terminal TIP provided on the container for external coupling. The container is, for example, a ceramic container or a metal container, but is not limited thereto. The terminal TIP is a metal lead, a bump, or the like provided on the outside of the container. The coupling in the present exemplary embodiment is an electrical coupling. The electrical coupling is a coupling in which an electric signal can be transmitted, and is a coupling in which information can be transmitted by the electric signal. The electrical coupling may be a coupling through a passive element, an active element, or the like.

The circuit device 100 includes a clock signal generation circuit 110, a time-to-digital conversion circuit 120, a time-counting circuit 145, and terminals TX1, TX2, and TI.

The terminals TX1, TX2, and TI are pads formed on the semiconductor substrate. The terminal TX1 is coupled to one end of the resonator XTAL, and the terminal TX2 is coupled to the other end of the resonator XTAL. The terminal TI is coupled to the terminal TIP of the real-time clock device 10. The couplings are electrical couplings as described above and are realized by, for example, in-package wiring, wire bonding, or a metal bump.

The clock signal generation circuit 110 includes an oscillation circuit 117. The oscillation circuit 117 is electrically coupled to the resonator XTAL through the terminals TX1 and TX2, and oscillates the resonator XTAL to generate an oscillation clock signal. The clock signal generation circuit 110 outputs a time-counting clock signal CLK based on the oscillation clock signal. For example, the clock signal generation circuit 110 may include an output circuit that buffers the oscillation clock signal and outputs the signal as the time-counting clock signal CLK, or a divider circuit that divides the oscillation clock signal and outputs the signal as the time-counting clock signal CLK.

The time-counting circuit 145 generates the time-counting data RTD based on the time-counting clock signal CLK. The time-counting data RTD is time information and is a digital value indicating a current time. The time-counting data RTD is count data obtained by counting the time with a time corresponding to a time-counting resolution as 1 LSB, for example. Alternatively, the time-counting data RTD may be data indicating a second, a minute, an hour, a day, a month, a year, and the like. A time-counting circuit 80 includes a counter that performs count processing based on the time-counting clock signal CLK. The counter counts the time-counting clock signal CLK or a divided clock signal thereof and outputs the time-counting data RTD based on the count value. That is, a cycle of the time-counting clock signal CLK or the divided clock signal thereof, which is counted by the counter, corresponds to the time-counting resolution.

An external signal EXIN is input to the terminal TIP from outside the real-time clock device 10. The external signal EXIN is a signal that transitions between a first voltage level and a second voltage level. The external signal EXIN may be a signal that periodically transitions or a signal that transitions irregularly, and a clock signal, a pulse signal, a trigger signal, or the like can be assumed as the external signal EXIN. For example, the external signal EXIN may be a time signal input from a GNSS or a network receiver, or an event signal input from a detection circuit that detects event occurrence. When the GNSS is GPS, the external signal EXIN is a 1 pps signal. The GNSS is an abbreviation for global navigation satellite system, and the GPS is an abbreviation for global positioning system.

The time-to-digital conversion circuit 120 receives the external signal EXIN from the terminal TIP through the terminal TI and a clock signal CLK' from the clock signal generation circuit 110. The time-to-digital conversion circuit 120 measures a time difference between a transition timing of a first signal based on the external signal EXIN and a transition timing of a second signal based on the clock signal CLK', and obtains time difference information TMD corresponding to the time difference. The clock signal CLK' may be the time-counting clock signal CLK or a clock signal upstream thereof. That is, the clock signal CLK' is the oscillation clock signal, the divided clock signal of the oscillation clock signal, or the time-counting clock signal CLK. The first signal is a signal whose transition timing is determined according to a transition timing of the external signal EXIN. For example, the first signal may be the external signal EXIN itself, a signal obtained by dividing the external signal EXIN, or a low-level or high-level latched signal at the transition timing of the external signal EXIN. The second signal is a signal whose transition timing is determined according to a transition timing of the clock signal CLK'. For example, the second signal may be the clock signal CLK' itself, a signal obtained by dividing the clock signal CLK', or a low-level or high-level latched signal at the transition timing of the clock signal CLK'. The transition timing is a timing at which a voltage level of a signal changes and is a rising edge or a falling edge of the signal.

Figure 2:
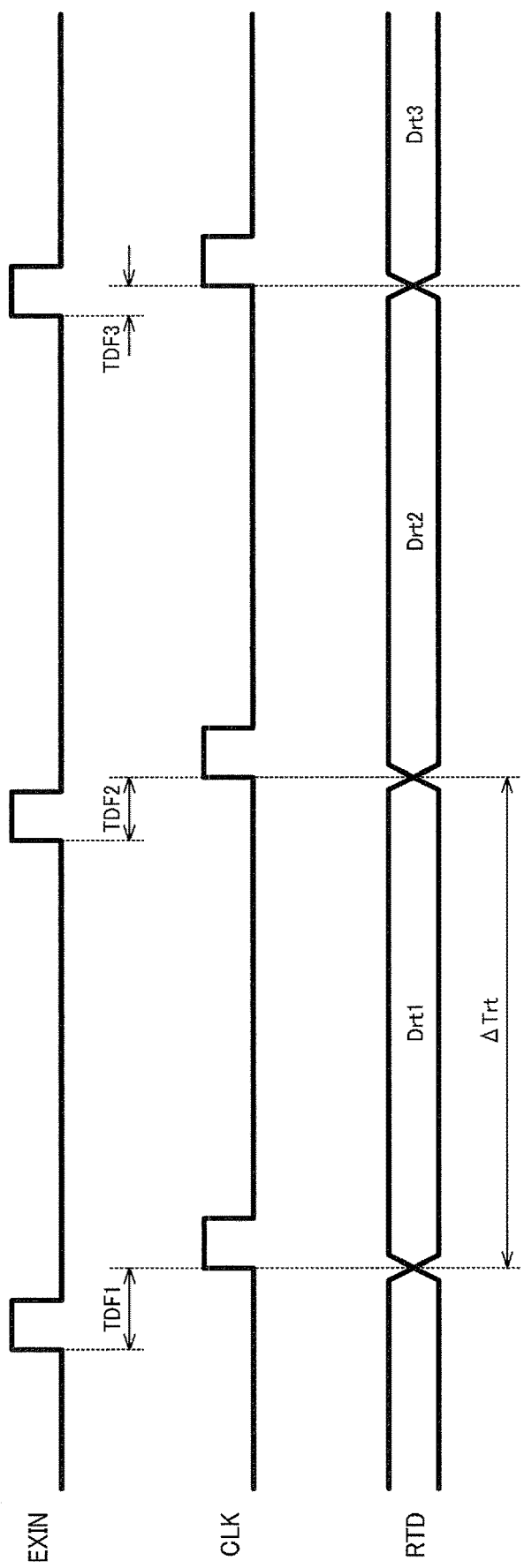
FIG. 2 is a waveform diagram describing an operation of the real-time clock device.

FIG. 2 is a waveform diagram for describing an operation of the real-time clock device 10. FIG. 2 illustrates a case where the external signal EXIN is a periodic pulse signal and the clock signal CLK' is the time-counting clock signal CLK.

The time-counting circuit 145 performs the time-counting with the time-counting clock signal CLK and outputs time-counting data Drt1, Drt2, and Drt3 corresponding to each transition timing of the time-counting clock signal CLK. Since the time-counting is performed by the time-counting clock signal CLK, a cycle ΔTrt of the time-counting clock signal CLK becomes the time-counting resolution. The time-to-digital conversion circuit 120 measures a time difference between the transition timing of the external signal EXIN and the transition timing of the time-counting clock signal CLK. This measurement is performed at each transition timing of the external signal EXIN, and time differences TDF1, TDF2, and TDF3 are measured in time series. The time differences TDF1 to TDF3 are shorter than the cycle ΔTrt of the time-counting clock signal CLK. That is, the time-to-digital conversion circuit 120 performs time measurement with a resolution higher than the time-counting resolution.

According to the present exemplary embodiment, since the real-time clock device 10 includes the time-to-digital conversion circuit 120, it is possible to acquire the time difference information TMD having the resolution higher than the time-counting resolution of the time-counting circuit 145. That is, the time-counting circuit 145 performs the count processing using the time-counting clock signal CLK, but it is possible to acquire the time difference information TMD without being limited by the time resolution of this count processing. Accordingly, it is possible to realize a highly accurate real-time clock device. A specific application example of the real-time clock device 10 will be described below. For example, when the external signal EXIN is the trigger signal such as the event signal, a time at which a trigger input occurs can be obtained with higher accuracy than time-counting accuracy of the time-counting circuit 145. Alternatively, when the external signal EXIN is a reference clock signal, a phase difference between the reference clock signal and the time-counting clock signal CLK is obtained with higher accuracy than the time-counting accuracy of the time-counting circuit 145 and frequency correction or the like of the time-counting clock signal CLK using the result is performed. As a result, it is possible to improve the time-counting accuracy.

In the present exemplary embodiment, the clock signal generation circuit 110, the time-counting circuit 145, and the time-to-digital conversion circuit 120 are provided on one semiconductor substrate. Accordingly, it is possible to suppress the delay or waveform deformation of a signal to be measured, as compared with a case where the clock signal generation circuit 110, the time-counting circuit 145, and the time-to-digital conversion circuit 120 are configured as separate ICs. Therefore, it is possible to accurately measure the time difference between the transition timings of the external signal EXIN and the time-counting clock signal CLK. Accordingly, it is possible to realize a highly accurate real-time clock device.

2. Second Configuration Example

Figure 3:
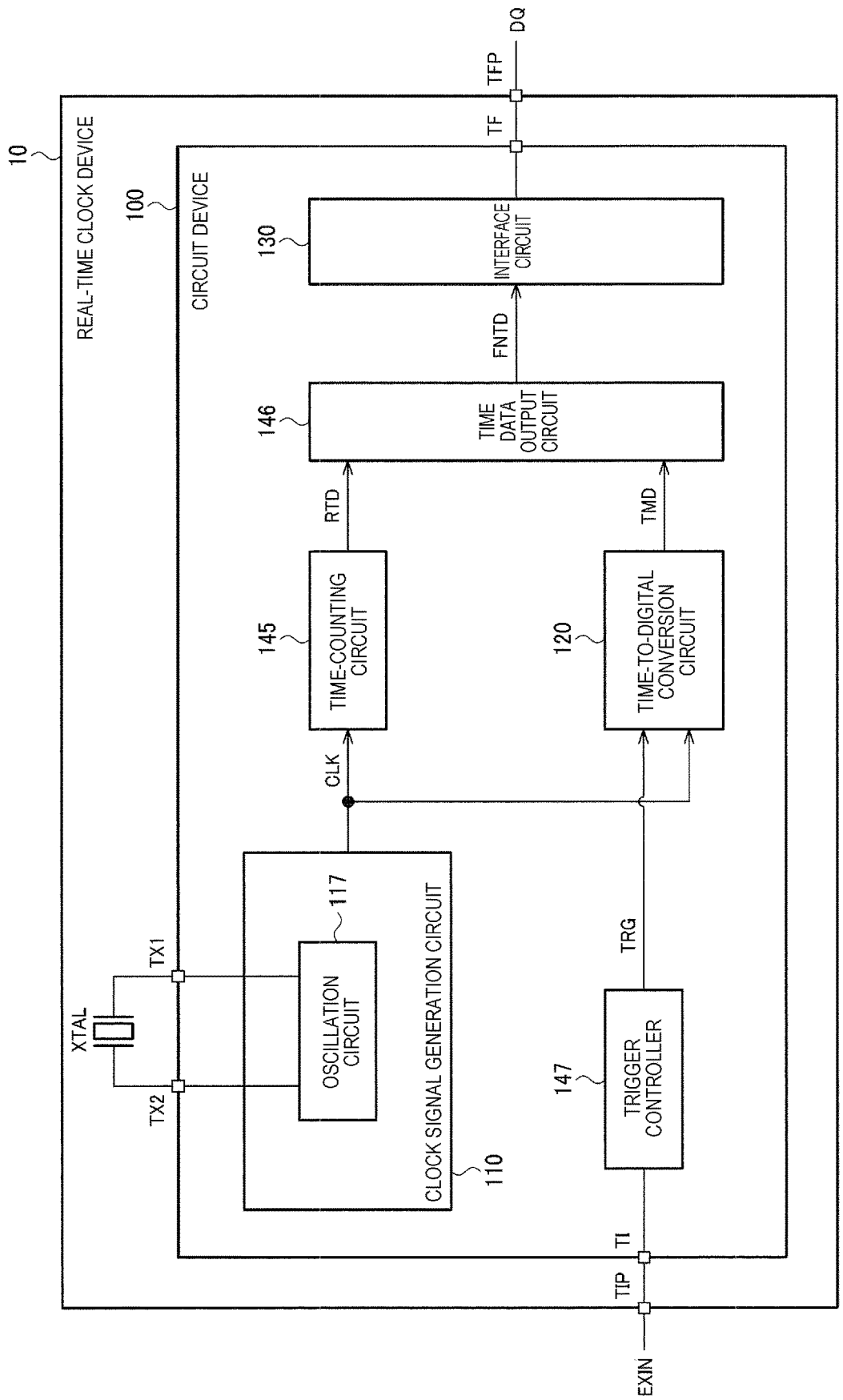
FIG. 3 is a second configuration example of the real-time clock device and the circuit device.

FIG. 3 is a second configuration example of the real-time clock device 10 and the circuit device 100. The real-time clock device 10 includes the resonator XTAL, the circuit device 100, and terminals TIP and TFP. The terminal TFP is an interface terminal. The circuit device 100 includes the clock signal generation circuit 110, the time-to-digital conversion circuit 120, an interface circuit 130, the time-counting circuit 145, a time data output circuit 146, a trigger controller 147, and terminals TI and TF. The same reference numeral is assigned to the same component as that already described, and the description of the component will be omitted as appropriate.

In the second configuration example, the external signal EXIN is the trigger signal. The trigger signal is a signal that instructs the real-time clock device 10 to acquire time data corresponding to the transition timing. The trigger signal is an event detection signal input from an event detection circuit, a signal that an external processing device requests the time data from the real-time clock device 10, or the like. The trigger controller 147 outputs a first signal TRG based on the trigger signal which is the external signal EXIN. The trigger controller 147, for example, performs waveform shaping of the external signal EXIN and outputs the first signal TRG that transitions at the transition timing of the external signal EXIN.

The time-to-digital conversion circuit 120 measures a time difference between transition timings of the first signal TRG and the time-counting clock signal CLK which is the second signal, and outputs the time difference information TMD indicating the time difference. In this configuration example, the time-counting clock signal CLK corresponds to the clock signal CLK' in FIG. 1.

The time data output circuit 146 outputs time data FNTD having a resolution higher than the time-counting resolution based on the time-counting data RTD and the time difference information TMD. The time data FNTD is time stamp information, and the time stamp information indicates a transition timing of the trigger signal input as the external signal EXIN. The time data output circuit 146 may output the time-counting data RTD and the time difference information TMD as the time data FNTD, or correct the time-counting data RTD by the time difference information TMD and output the corrected data as the time data FNTD. For example, when the external signal EXIN in FIG. 2 is the trigger signal, times of the transition timing of the trigger signal become Drt1-TDF1, Drt2-TDF2, and Drt3-TDF3. The time data output circuit 146 may output Drt1 and TDF1, Drt2 and TDF1, and Drt3 and TDF1 as the time data FNTD. Alternatively, the time data output circuit 146 may calculate Drt1-TDF1, Drt2-TDF2, and Drt3-TDF3 and output the calculated times as the time data FNTD.

The interface circuit 130 outputs output information DQ based on the time-counting data RTD and the time difference information TMD to the outside of the real-time clock device 10 through the terminals TF and TFP. In the second configuration example, the interface circuit 130 outputs the time data FNTD as the output information DQ.

The interface circuit 130 communicates with the processing device provided outside the real-time clock device 10 and the real-time clock device 10 through the terminals TF and TFP. The terminal TF is a pad formed on the semiconductor substrate. The terminal TFP is a metal lead, a bump, or the like provided on the outside of a package container. The terminal TF is electrically coupled to the terminal TFP, and the coupling is realized by, for example, in-package wiring, wire bonding, or a metal bump. As a communication method of the interface circuit 130, various communication methods such as serial communication or parallel communication can be employed. Examples of the serial communication methods include SPI and I2C. The SPI is three-wire or four-wire serial communication and performs the communication using a chip select signal, a clock signal, and a data signal. The I2C is a two-wire serial communication and performs the communication using a clock signal and a data signal. The SPI is an abbreviation for serial peripheral interface, and the I2C is an abbreviation for inter-integrated circuit. FIG. 3 illustrates one set of terminals TF and TFP as the interface terminal, but the present disclosure is not limited thereto. A plurality of sets of interface terminals may be provided according to a communication format of the interface circuit 130.

Figure 4:
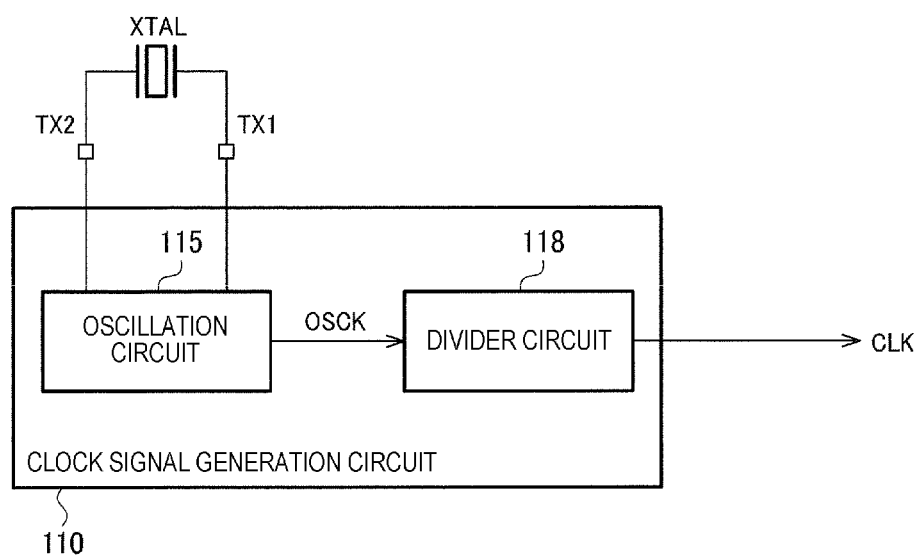
FIG. 4 is a first detailed configuration example of a clock signal generation circuit.

FIG. 4 is a first detailed configuration example of the clock signal generation circuit 110. The clock signal generation circuit 110 includes an oscillation circuit 115 and a divider circuit 118. The oscillation circuit 115 corresponds to the oscillation circuit 117 in FIG. 3.

The oscillation circuit 115 oscillates the resonator XTAL to generate an oscillation clock signal OSCK. As the oscillation circuit 115, various types of oscillation circuits such as a Pierce type, a Colpitts type, an inverter type, or a Hartley type can be used. The divider circuit 118 divides the oscillation clock signal OSCK and outputs the divided clock signal to the time-counting circuit 145 as the time-counting clock signal CLK. The time-counting clock signal CLK is input to the time-to-digital conversion circuit 120. The clock signal generation circuit 110 in FIG. 3 is not limited to the configuration of FIG. 4. For example, the divider circuit 118 in FIG. 4 may be omitted, and the oscillation clock signal OSCK may be input as the time-counting clock signal CLK to the time-counting circuit 145 and the time-to-digital conversion circuit 120.

3. Third Configuration Example

Figure 5:
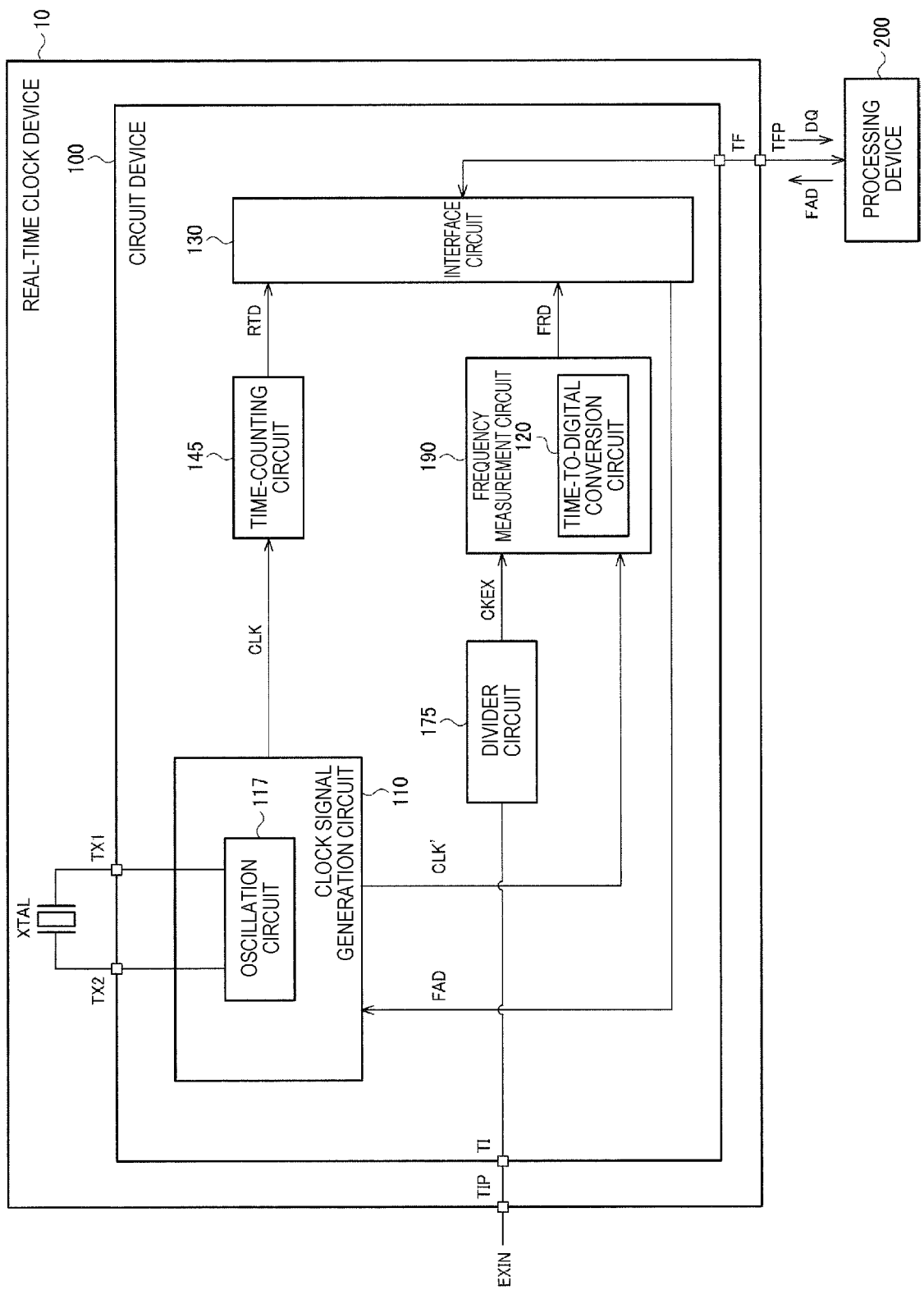
FIG. 5 is a third configuration example of the circuit device.

FIG. 5 is a third configuration example of the circuit device 100. The circuit device 100 includes the clock signal generation circuit 110, the interface circuit 130, the time-counting circuit 145, a divider circuit 175, a frequency measurement circuit 190, and the terminals TI and TF. The same reference numeral is assigned to the same component as that already described, and the description of the component will be omitted as appropriate.

An external clock signal is input to the terminal TIP as the external signal EXIN. The external clock signal is, for example, a time signal input from a GNSS or a network receiver, or a reference clock signal input from a reference clock source such as an oscillator. The divider circuit 175 divides the external clock signal which is the external signal EXIN and outputs a divided clock signal CKEX obtained by the division to the frequency measurement circuit 190. The divider circuit 175 may be omitted and the external clock signal may be input to the frequency measurement circuit 190.

The frequency measurement circuit 190 measures a frequency of the external clock signal based on a frequency of the clock signal CLK' to obtain frequency information FRD corresponding to the frequency of the external clock signal. In FIG. 5, the frequency measurement circuit 190 measures a frequency of the divided clock signal CKEX to substantially measure the frequency of the external clock signal. The frequency information FRD is information indicating the frequency and is specifically a digital value in which the frequency is encoded. The frequency information FRD is a relative frequency of the external clock signal or the divided clock signal thereof based on the frequency of the clock signal CLK'. For example, in FIG. 5, the frequency information FRD is the frequency of the divided clock signal CKEX based on the frequency of the clock signal CLK'.

The frequency measurement circuit 190 includes the time-to-digital conversion circuit 120. Although the details will be described below, the time-to-digital conversion circuit 120 measures a time difference between transition timings of a first signal based on the external clock signal and a second signal based on the clock signal CLK'. The frequency measurement circuit 190 can measure a cycle of the external clock signal with a time resolution higher than a cycle of the clock signal CLK' using the time difference information TMD output from the time-to-digital conversion circuit 120, and highly accurate frequency measurement can be realized based on the cycle.

The interface circuit 130 outputs the time-counting data RTD and the frequency information FRD as the output information DQ. A processing device 200 receives at least the frequency information FRD of the output information DQ. The processing device 200 generates a frequency adjustment signal FAD based on the frequency information FRD and outputs the frequency adjustment signal FAD to the real-time clock device 10. The interface circuit 130 outputs the received frequency adjustment signal FAD to the clock signal generation circuit 110. The clock signal generation circuit 110 adjusts the frequency of the time-counting clock signal CLK based on the frequency adjustment signal FAD. The frequency adjustment signal FAD is, for example, frequency adjustment data of a digital signal, but may be a frequency adjustment voltage of an analog signal.

The processing device 200 is a processor, and the processor is, for example, a microcomputer, a CPU, or a DSP. The processing device 200 performs signal processing using the frequency information FRD to generate the frequency adjustment signal FAD. As described above, the frequency information FRD indicates a frequency ratio between the external clock signal and the clock signal CLK'. The processing device 200 generates the frequency adjustment signal FAD such that the frequency ratio becomes a target value. Accordingly, the time-counting clock signal CLK that is frequency-synchronized with the external clock signal at a predetermined frequency ratio is obtained, and the time-counting circuit 145 performs the time-counting using the time-counting clock signal CLK. Therefore, it is possible to realize a highly accurate real-time clock device.

Figure 6:
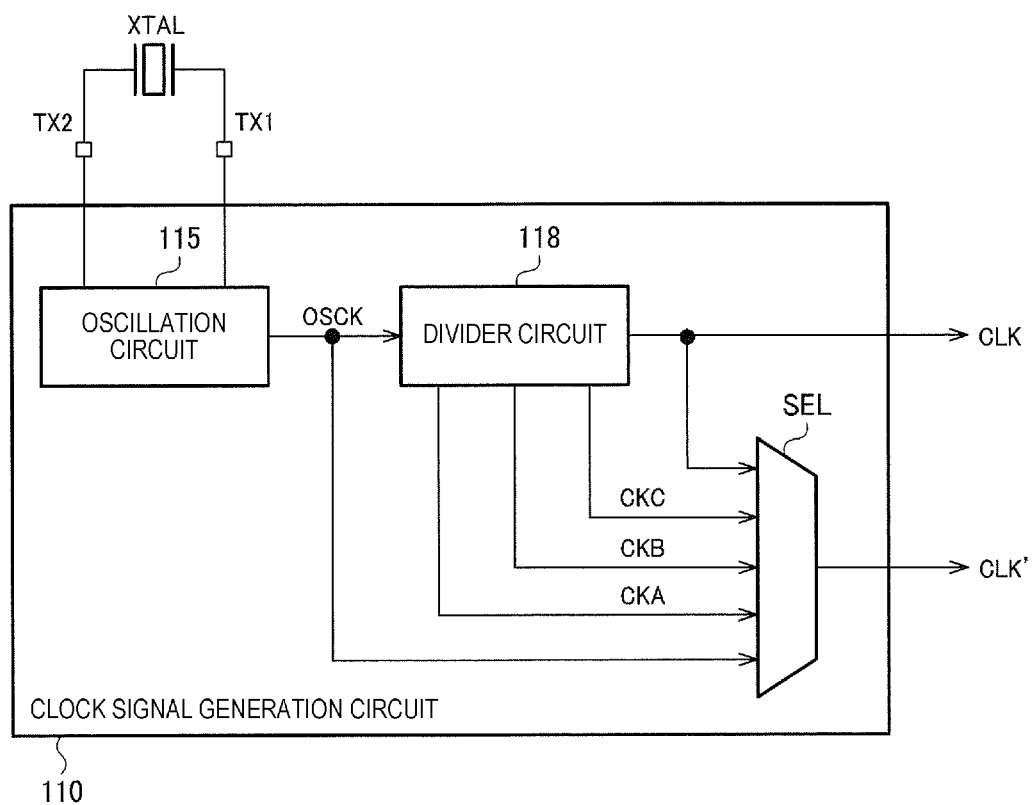
FIG. 6 is a second detailed configuration example of the clock signal generation circuit.

FIG. 6 is a second detailed configuration example of the clock signal generation circuit 110. The clock signal generation circuit 110 includes the oscillation circuit 115, the divider circuit 118, and a selector SEL.

The divider circuit 118 outputs divided clock signals CKA to CKC obtained by dividing the oscillation clock signal OSCK at division ratios different from each other and the time-counting clock signal CLK. The selector SEL selects one of the oscillation clock signal OSCK, the divided clock signals CKA, CKB, and CKC, or the time-counting clock signal CLK, and outputs the selected signal as the clock signal CLK' to the time-to-digital conversion circuit 120. The selector SEL may be omitted, and any one of the oscillation clock signal OSCK or the divided clock signals CKA, CKB, and CKC may be input to the time-to-digital conversion circuit 120 as the clock signal CLK'.

Figure 7:
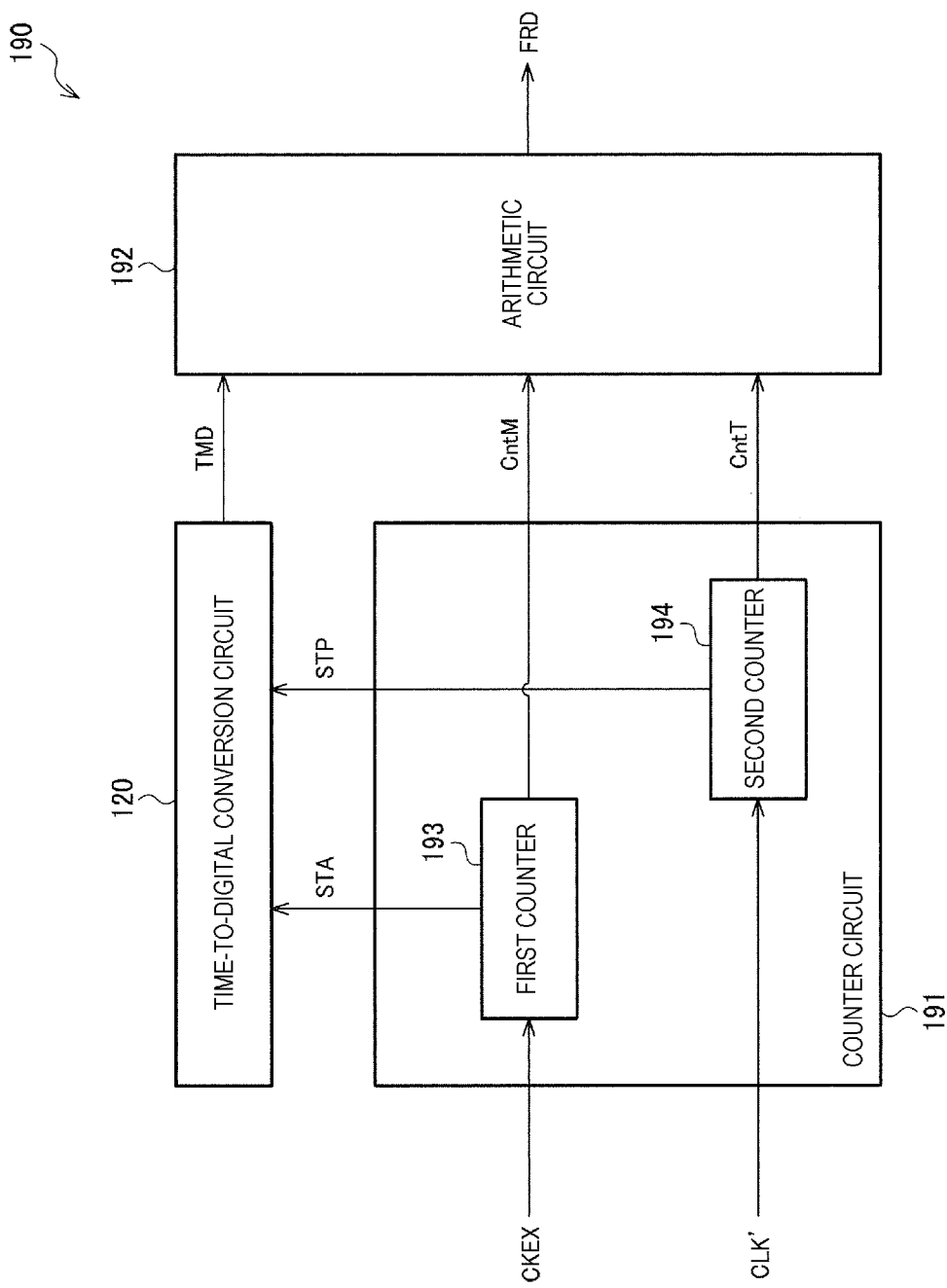
FIG. 7 is a detailed configuration example of a frequency measurement circuit.

FIG. 7 is a detailed configuration example of the frequency measurement circuit 190. The frequency measurement circuit 190 includes the time-to-digital conversion circuit 120, a counter circuit 191, and an arithmetic circuit 192.

The time-to-digital conversion circuit 120 measures a time difference between a transition timing of a first signal STA based on the divided clock signal CKEX and a transition timing of a second signal STP based on the clock signal CLK', and obtains the time difference information TMD corresponding to the time difference. Since the divided clock signal CKEX is a divided clock signal of the external clock signal, the first signal STA is a signal based on the external clock signal. The first signal STA and the second signal STP are input from the counter circuit 191 to the time-to-digital conversion circuit 120. Details of the first signal STA and the second signal STP will be described below.

The counter circuit 191 performs the count processing based on the divided clock signal CKEX and the clock signal CLK', and outputs count data CntM and CntT obtained by the count processing. Specifically, the counter circuit 191 includes a first counter 193 and a second counter 194. The first counter 193 performs count processing based on the divided clock signal CKEX and outputs the count data CntM. The second counter 194 performs the count processing based on the clock signal CLK' and outputs the count data CntT.

The arithmetic circuit 192 performs a calculation based on the time difference information TMD and the count data CntM and CntT to obtain the frequency information FRD. The count data CntM corresponds to a time whose resolution is the cycle of the divided clock signal CKEX, and the count data CntT corresponds to a time whose resolution is the cycle of the clock signal CLK'. In addition to the above, the arithmetic circuit 192 can accurately determine the cycle of the divided clock signal CKEX based on the cycle of the clock signal CLK' using the time difference information TMD measured with a time resolution smaller than the clock cycle. The frequency can be obtained by a reciprocal of the cycle.

Figure 8:
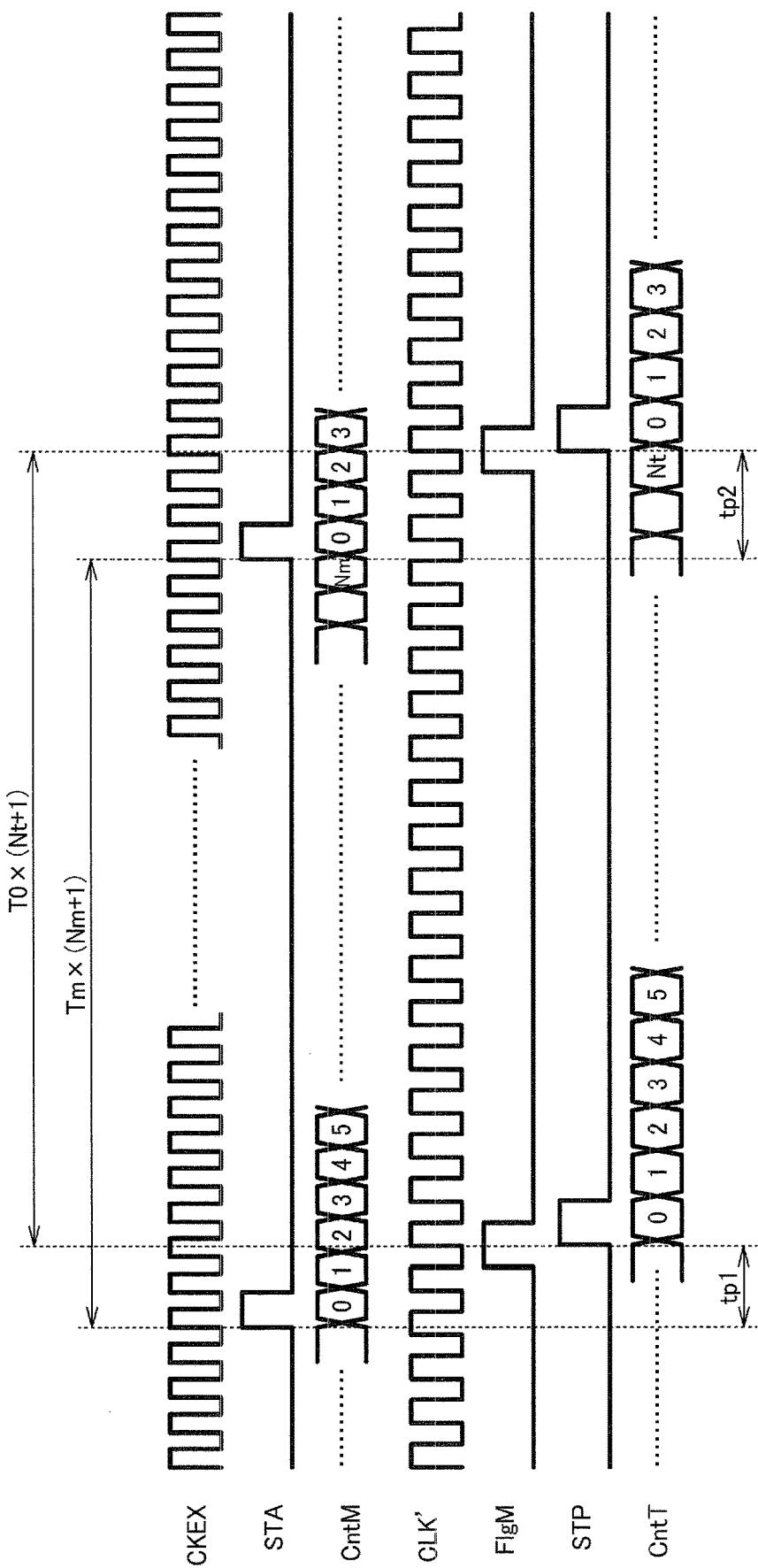
FIG. 8 is a waveform diagram describing an operation of the frequency measurement circuit.

FIG. 8 is a waveform diagram describing an operation of the frequency measurement circuit 190. FIG. 8 illustrates a case where the first signal STA is a start signal and the second signal STP is a stop signal. The transition timing is a timing of the rising edge.

The first counter 193 counts the number of pulses of the divided clock signal CKEX and causes the first signal STA to transition at Nm+1 counting cycle. The first counter 193 outputs a count value Nm as the count data CntM. The Nm is a predetermined count value, which may be set in advance or may be set by register setting, for example.

Specifically, the first counter 193 resets the count value to zero and causes the first signal STA to transition from a low level to a high level at the transition timing of the divided clock signal CKEX. The first counter 193 counts the number of pulses of the divided clock signal CKEX up to the count value Nm, and resets the count value to zero again and causes the first signal STA to transition from the low level to the high level at the transition timing of the divided clock signal CKEX. The first signal STA is at the high level for one cycle of the divided clock signal CKEX, for example, but the number of cycles may be random.

The second counter 194 causes the second signal STP to transition at the transition timing of the clock signal CLK' after the transition of the first signal STA. The second counter 194 counts the number of pulses of the clock signal CLK' in a period from the transition of the second signal STP to the transition of the next second signal STP, and outputs a count value Nt as the count data CntT.

Specifically, the second counter 194 causes a signal FlgM to transition from the low level to the high level at a second falling edge of the clock signal CLK' and causes the signal FlgM to transition from the high level to the low level at the next falling edge of the clock signal CLK', after the first signal STA transitions from the low level to the high level. The signal FlgM is an internal signal of the second counter 194. The second counter 194 causes the second signal STP to transition from the low level to the high level at the rising edge of the clock signal CLK' when the signal FlgM is at the high level.

The second counter 194 resets the count value to zero at the timing when the second signal STP transitions from the low level to the high level. The second counter 194 counts the number of pulses of the clock signal CLK' until the timing at which the second signal STP transitions to the high level next, and outputs the count value Nt at that time as the count data CntT.

The time-to-digital conversion circuit 120 measures the time difference between the transition timing of the first signal STA and the transition timing of the second signal STP. Since the first signal STA transitions periodically, the time difference is measured corresponding to each transition timing. The time differences in time series are tp1 and tp2.

The time-to-digital conversion circuit 120 outputs the time difference information TMD indicating the time differences tp1 and tp2.

The arithmetic circuit 192 obtains a frequency fm of the divided clock signal CKEX by the following equations (1) and (2). T0 is the cycle of the clock signal CLK', which is a known value. Tm is the cycle of the divided clock signal CKEX, and its reciprocal is the frequency fm. Although the cycle T0 of the clock signal CLK' is known, it is known as an ideal value. The T0 actually differs from the ideal value due to a variation in an oscillation frequency or the like. The actual T0 is unknown from this point, and it can be said that a relative frequency ratio of the divided clock signal CKEX to the frequency of the unknown clock signal CLK' is measured as fm.

$$Tm = \frac{T0(Nt+1) + (tp1 - tp2)}{Nm + 1} \tag{1}$$

$$fm = \frac{1}{Tm} \tag{2}$$

According to the present exemplary embodiment, the counter circuit 191 measures the cycle Tm of the divided clock signal CKEX with reference to the cycle T0 of the clock signal CLK', but the time-to-digital conversion circuit 120 further measures the time differences tp1 and tp2 with a resolution smaller than the cycle T0.

Accordingly, the arithmetic circuit 192 can calculate the cycle Tm of the divided clock signal CKEX with the resolution smaller than the cycle T0 and can obtain the accurate frequency fm of the divided clock signal CKEX.

Figure 9:
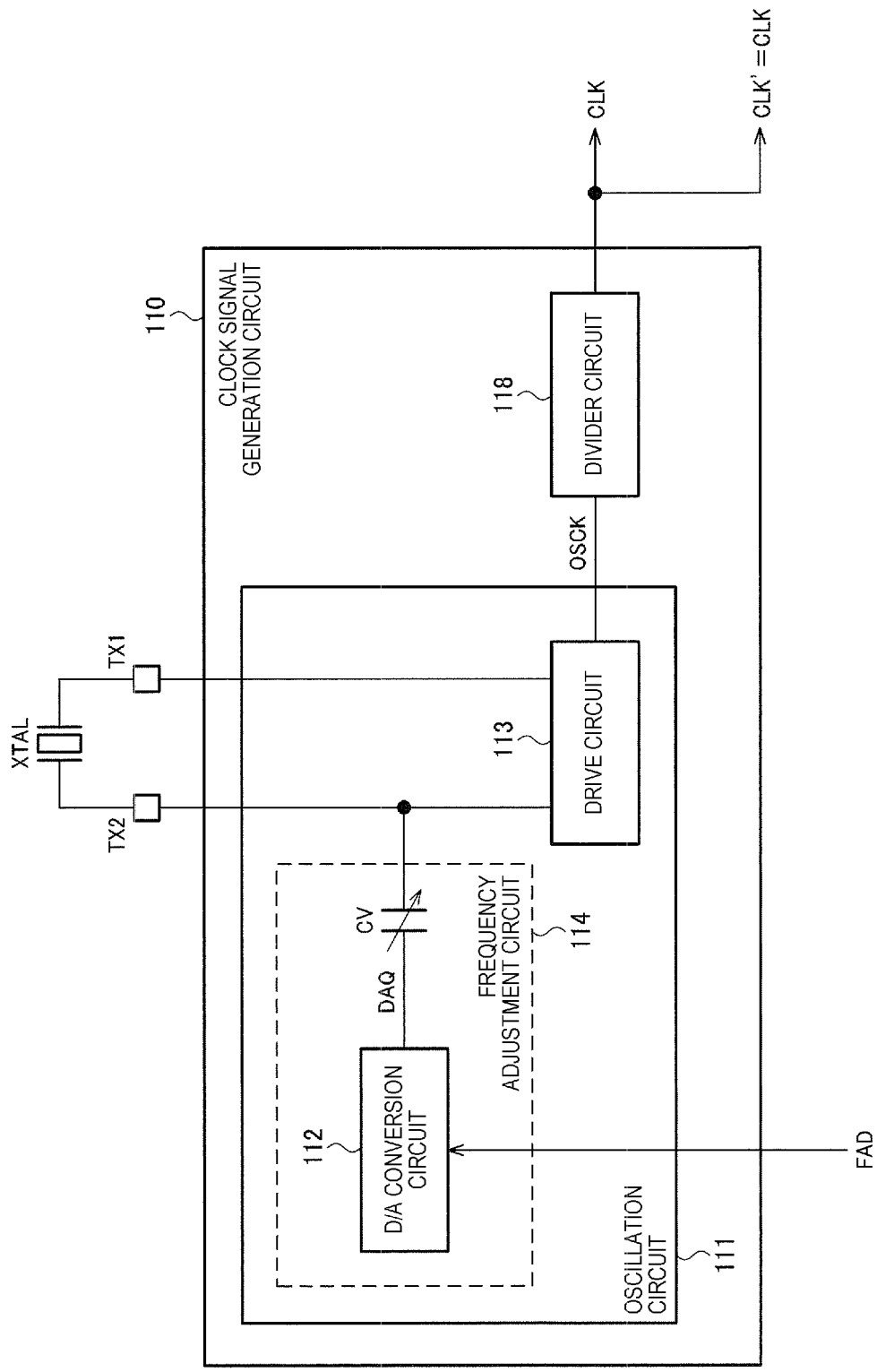
FIG. 9 is a third detailed configuration example of the clock signal generation circuit.

FIG. 9 is a third detailed configuration example of the clock signal generation circuit 110. The clock signal generation circuit 110 includes an oscillation circuit 111 and the divider circuit 118. The oscillation circuit 111 corresponds to the oscillation circuit 117 in FIG. 5.

The oscillation circuit 111 is a DCXO whose oscillation frequency is controlled by the frequency adjustment signal FAD of the digital signal. The DCXO is an abbreviation for digital controlled crystal oscillator. The oscillation circuit 111 oscillates the resonator XTAL to generate the oscillation clock signal OSCK and adjusts a frequency of the oscillation clock signal OSCK based on the frequency adjustment signal FAD. Specifically, the oscillation circuit 111 includes a drive circuit 113 and a frequency adjustment circuit 114.

The drive circuit 113 is electrically coupled to the resonator XTAL through the terminals TX1 and TX2, drives the resonator XTAL to oscillate, and outputs the oscillation clock signal OSCK.

The frequency adjustment circuit 114 is coupled to a node that couples the terminal TX1 or the terminal TX2 and the drive circuit 113, and adjusts the oscillation frequency based on the frequency adjustment signal FAD. FIG. 9 illustrates a case where the frequency adjustment circuit 114 is coupled to the node that couples the terminal TX2 and the drive circuit 113. The frequency adjustment circuit 114 includes a D/A conversion circuit 112 and a variable capacitor CV. The D/A conversion circuit 112 performs a D/A conversion on the frequency adjustment signal FAD and outputs a voltage DAQ obtained by the D/A conversion to one end of the variable capacitor CV. The other end of the variable capacitor CV is coupled to the node that couples the terminal TX2 and the drive circuit 113. The variable capacitor CV is a capacitor whose capacitance value changes according to voltages of both ends thereof, and is, for example, a MOS capacitor or a variable capacitance diode.

The divider circuit 118 divides the oscillation clock signal OSCK and outputs the divided clock signal as the time-counting clock signal CLK. The clock signal CLK' input to the time-to-digital conversion circuit 120 is the time-counting clock signal CLK.

According to the present exemplary embodiment, the voltage DAQ at the one end of the variable capacitor CV changes according to the frequency adjustment signal FAD. Therefore, the capacitance value of the variable capacitor CV changes according to the frequency adjustment signal FAD. Accordingly, a capacitive load of the drive circuit 113 that drives the resonator XTAL changes. Therefore, the frequency of the oscillation clock signal OSCK changes according to the frequency adjustment signal FAD. Accordingly, the frequency adjustment of the time-counting clock signal CLK is realized by the frequency adjustment signal FAD.

The configuration of the oscillation circuit 111 is not limited to that shown in FIG. 9. For example, when the frequency adjustment signal FAD is a digital signal, the frequency adjustment circuit 114 may be a capacitor array. The capacitor array is a variable capacitance circuit whose capacitance value is variably switched by switching a switch based on the frequency adjustment signal FAD. One end of the capacitor array is coupled to the ground, and the other end is coupled to the node that couples the terminal TX1 or the terminal TX2 and the drive circuit 113.

Alternatively, when the frequency adjustment signal FAD is an analog signal, the oscillation circuit 111 may be a VCO. The VCO is an abbreviation for voltage controlled oscillator. That is, the D/A conversion circuit 112 may be omitted from the oscillation circuit 111 in FIG. 9, and the frequency adjustment signal FAD which is the analog signal may be input to the one end of the variable capacitor CV.

Figure 10:
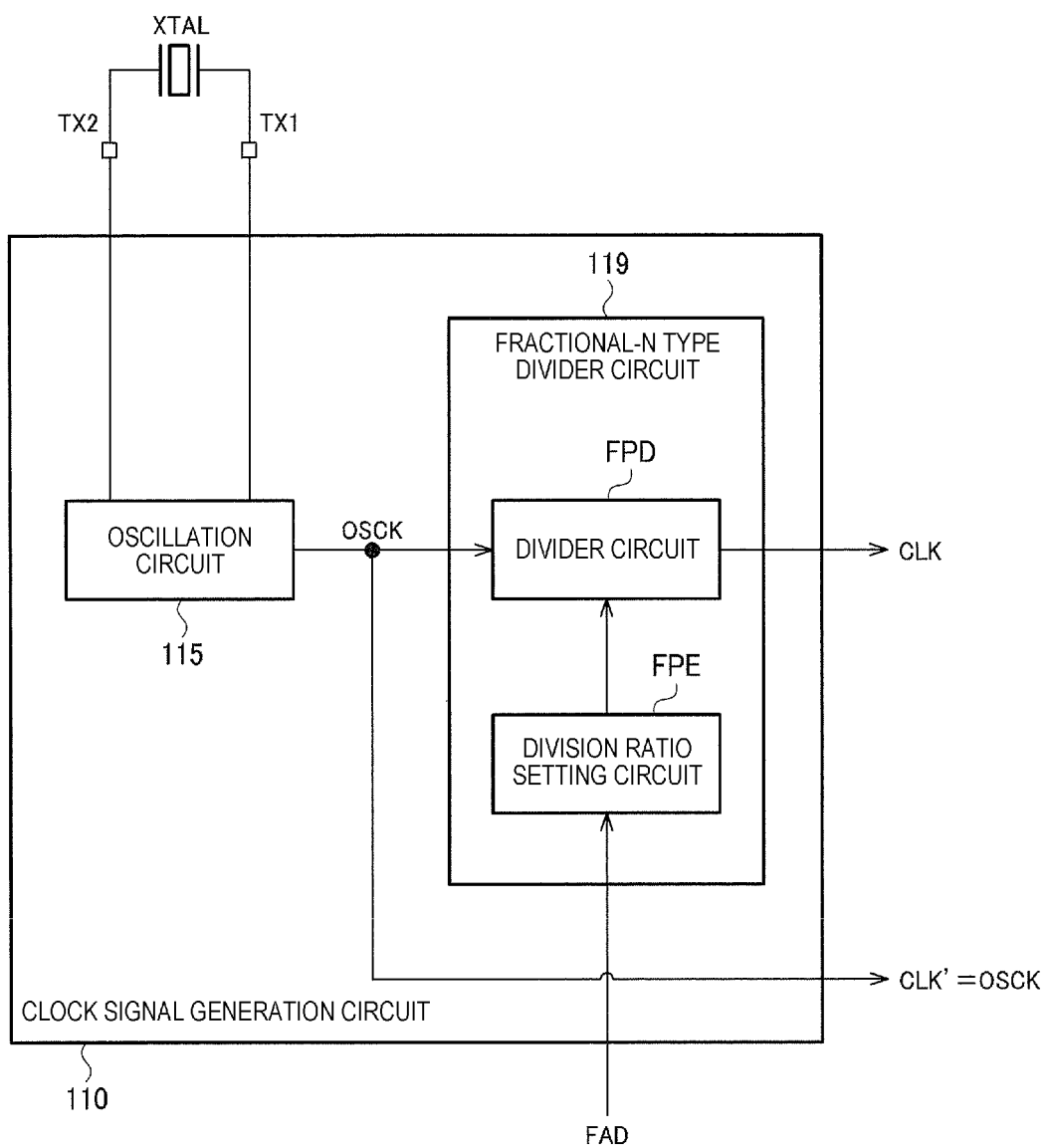
FIG. 10 is a fourth detailed configuration example of the clock signal generation circuit.

FIG. 10 is a fourth detailed configuration example of the clock signal generation circuit 110. The clock signal generation circuit 110 includes the oscillation circuit 115 and a fractional-N type divider circuit 119. The oscillation circuit 115 corresponds to the oscillation circuit 117 in FIG. 5. Since the oscillation circuit 115 is as described in FIG. 4, the description thereof will be omitted.

The fractional-N type divider circuit 119 divides the oscillation clock signal OSCK by a decimal division ratio based on the frequency adjustment signal FAD which is the digital signal. Specifically, the fractional-N type divider circuit 119 includes a divider circuit FPD and a division ratio setting circuit FPE.

The division ratio setting circuit FPE sets the decimal division ratio based on the frequency adjustment signal FAD and outputs information on the division ratio to the divider circuit FPD. The divider circuit FPD divides the oscillation clock signal OSCK with the division ratio instructed by the information on the division ratio and outputs the divided clock signal as the time-counting clock signal CLK. Specifically, the division ratio setting circuit FPE changes an integer division ratio in time series to set a division ratio that is a decimal as a time average. The divider circuit FPD divides the oscillation clock signal OSCK by the integer division ratio, but the integer division ratio changes in time series. Therefore, the oscillation clock signal OSCK is divided by the decimal division ratio as the time average. The division ratio setting circuit FPE is, for example, a delta-sigma modulation circuit that performs a delta-sigma modulation on the frequency adjustment signal FAD to generate the decimal division ratio. The oscillation clock signal OSCK is input to the time-to-digital conversion circuit 120 as the clock signal CLK'.

According to the present exemplary embodiment, the decimal division ratio of the fractional-N type divider circuit 119 changes according to the frequency adjustment signal FAD. Accordingly, the frequency adjustment of the time-counting clock signal CLK is realized by the frequency adjustment signal FAD.

4. Fourth Configuration Example

Figure 11:
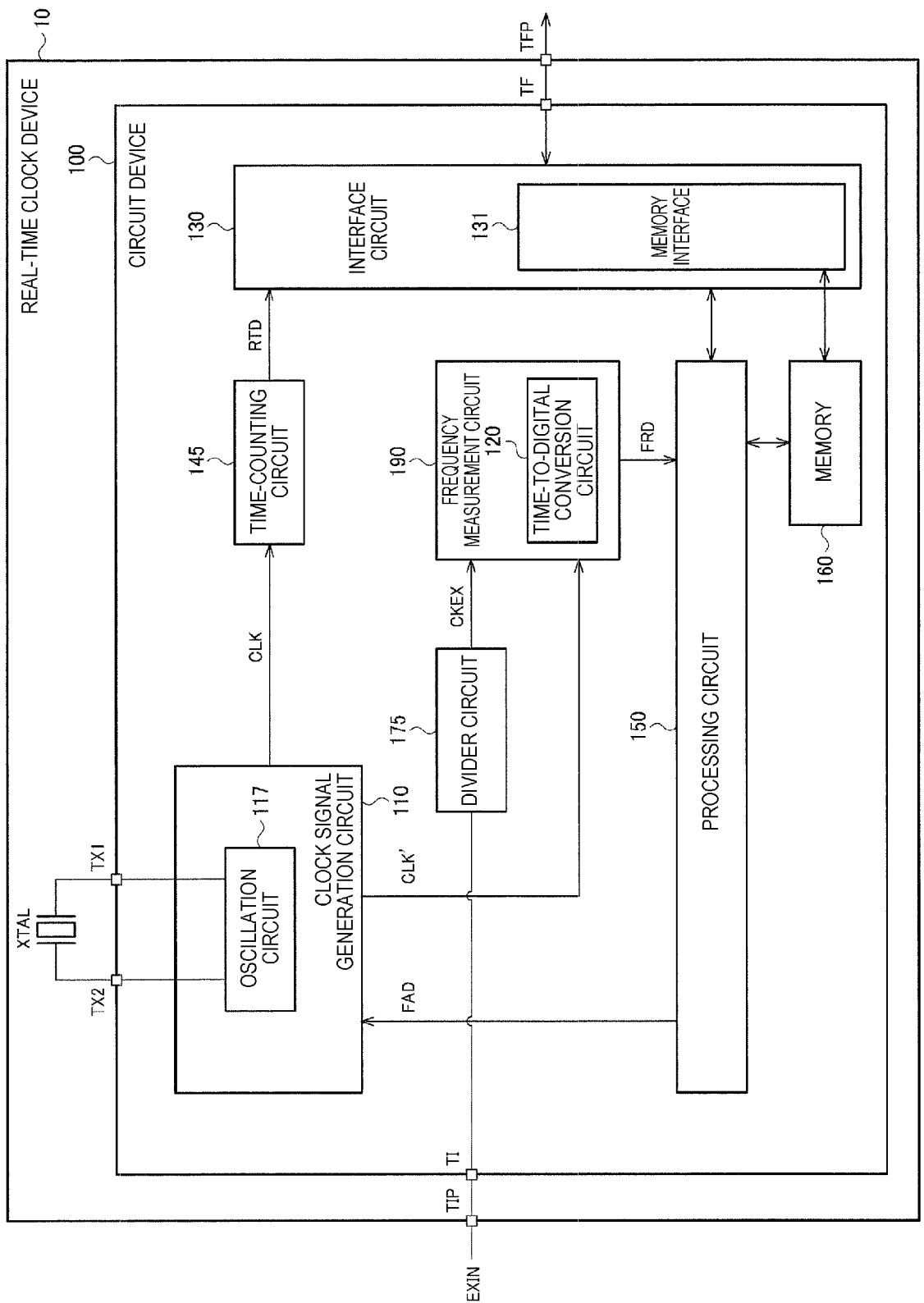
FIG. 11 is a fourth configuration example of the circuit device.

FIG. 11 is a fourth configuration example of the circuit device 100. The circuit device 100 includes the clock signal generation circuit 110, the interface circuit 130, the time-counting circuit 145, a processing circuit 150, a memory 160, the divider circuit 175, the frequency measurement circuit 190, and the terminals TI and TF. The same reference numeral is assigned to the same component as that already described, and the description of the component will be omitted as appropriate.

In the fourth configuration example, the interface circuit 130 outputs the time-counting data RTD as an output signal from the time-counting circuit 145 to the outside of the real-time clock device 10. The frequency information FRD is input to the processing circuit 150, and the processing circuit 150 generates the frequency adjustment signal FAD according to the frequency information FRD. The clock signal generation circuit 110 adjusts the frequency of the time-counting clock signal CLK based on the frequency adjustment signal FAD. A method by which the processing circuit 150 generates the frequency adjustment signal FAD is the same as the method described in FIG. 5 by which the processing device 200 generates the frequency adjustment signal FAD. The processing circuit 150 is a processor, and the processor is, for example, a microcomputer, a CPU core, or a DSP. The circuit device 100 including the processing circuit 150 is an integrated circuit device. That is, the processing circuit 150 and the memory 160 are provided in one integrated circuit device together with the clock signal generation circuit 110, the time-counting circuit 145, the frequency measurement circuit 190, and the interface circuit 130.

The memory 160 stores a program for the processing circuit 150 to generate the frequency adjustment signal FAD based on the frequency information FRD. The processing circuit 150 executes the program stored in the memory 160 to generate the frequency adjustment signal FAD based on the frequency information FRD. The memory 160 is a semiconductor memory such as a non-volatile memory or a RAM.

The interface circuit 130 includes a memory interface 131 for accessing the memory 160 from the outside of the real-time clock device 10. The memory interface 131 writes the program received by the interface circuit 130 from the outside of the real-time clock device 10 in the memory 160. The memory interface 131 may read the information stored in the memory 160, and the interface circuit 130 may transmit the information to the outside of the real-time clock device 10.

According to the present exemplary embodiment, a user can write various programs in the memory 160 through the memory interface 131, and various pieces of signal processing using the frequency information FRD can be realized by the programs. It is not necessary to provide a processing device for performing the signal processing using the frequency information FRD outside the real-time clock device 10 by incorporating the processing circuit 150 in the circuit device 100. That is, it is possible to realize the various pieces of signal processing using the frequency information FRD with the real-time clock device 10 alone.

5. Fifth Configuration Example

Figure 12:
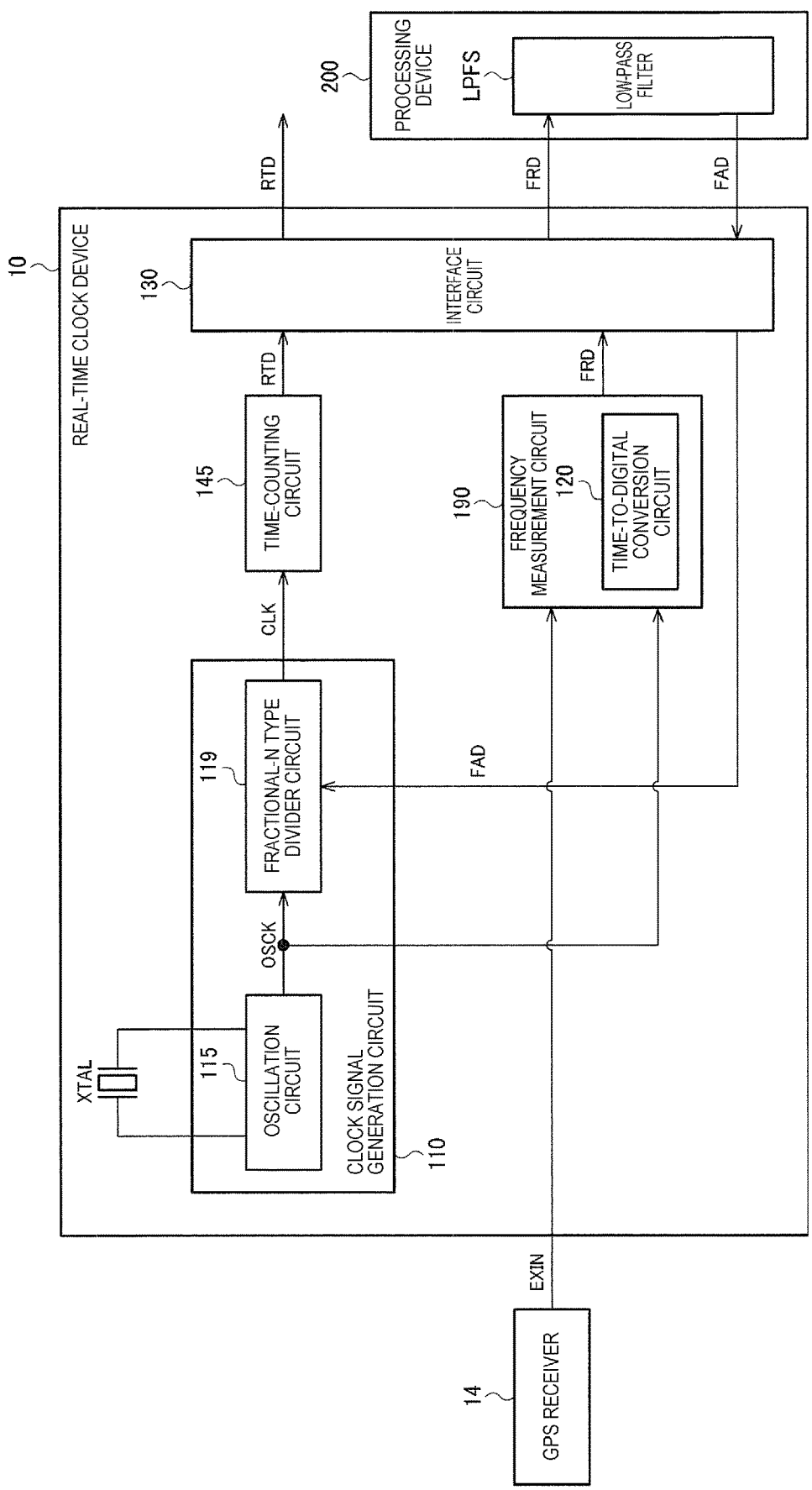
FIG. 12 is a configuration example of a real-time clock correction system using a GPS time signal.

FIG. 12 is a configuration example of a real-time clock correction system using a GPS time signal. The system in FIG. 12 includes a GPS receiver 14, the real-time clock device 10, and the processing device 200. FIG. 12 illustrates only an internal configuration of the circuit device 100 and the resonator XTAL in the real-time clock device 10. The illustration of the terminals is omitted.

The GPS receiver 14 receives a GPS satellite signal and outputs a 1 pps signal to the real-time clock device 10 as the external signal EXIN. The 1 pps signal is a time reference signal, which is a 1 Hz pulse signal.

The frequency measurement circuit 190 measures a frequency of the 1 pps signal which is the external signal EXIN with reference to the oscillation clock signal OSCK and outputs the frequency information FRD. When the frequency of the oscillation clock signal OSCK is F0 and the frequency of the 1 pps signal is Fref, the frequency information FRD indicates Fref/F0. Fref/F0 is measured at each transition timing of the 1 pps signal, and the frequency information FRD indicating Fref/F0 in time series is output. The interface circuit 130 outputs the frequency information FRD to the processing device 200.

The processing device 200 includes a low-pass filter LPFS. The low-pass filter LPFS performs low-pass filter processing on the frequency information FRD indicating Fref/F0 in time series and outputs the frequency adjustment signal FAD obtained by the processing. The frequency adjustment signal FAD is data indicating Fref/F0 smoothed by the low-pass filter processing. The processing device 200 outputs the frequency adjustment signal FAD to the real-time clock device 10.

The interface circuit 130 outputs the received frequency adjustment signal FAD to the fractional-N type divider circuit 119 of the clock signal generation circuit 110. The fractional-N type divider circuit 119 divides the oscillation clock signal OSCK by the division ratio Fref/F0 and outputs the time-counting clock signal CLK. Since the frequency of the oscillation clock signal OSCK is F0, the frequency of the time-counting clock signal CLK is Fref. In this manner, the frequency of the time-counting clock signal CLK is frequency-synchronized with the frequency Fref of the 1 pps signal, and the time-counting circuit 145 can perform the time-counting with the time-counting clock signal CLK equivalent to the 1 pps signal. Accordingly, it is possible to realize a highly accurate real-time clock device.

6. Time-To-Digital Conversion Circuit

A detailed configuration example of the time-to-digital conversion circuit 120 will be described with reference to FIGS. 13 to 16. When the time-to-digital conversion circuit 120 of FIGS. 13 to 16 is applied to FIG. 3, the first signal STA corresponds to TRG in FIG. 3. The time-to-digital conversion circuit 120 may further include a circuit that outputs the second signal STP based on the clock signal CLK'. This circuit outputs the second signal STP that transitions at the transition timing of the clock signal CLK' after the transition of the first signal STA, for example.

Figure 13:
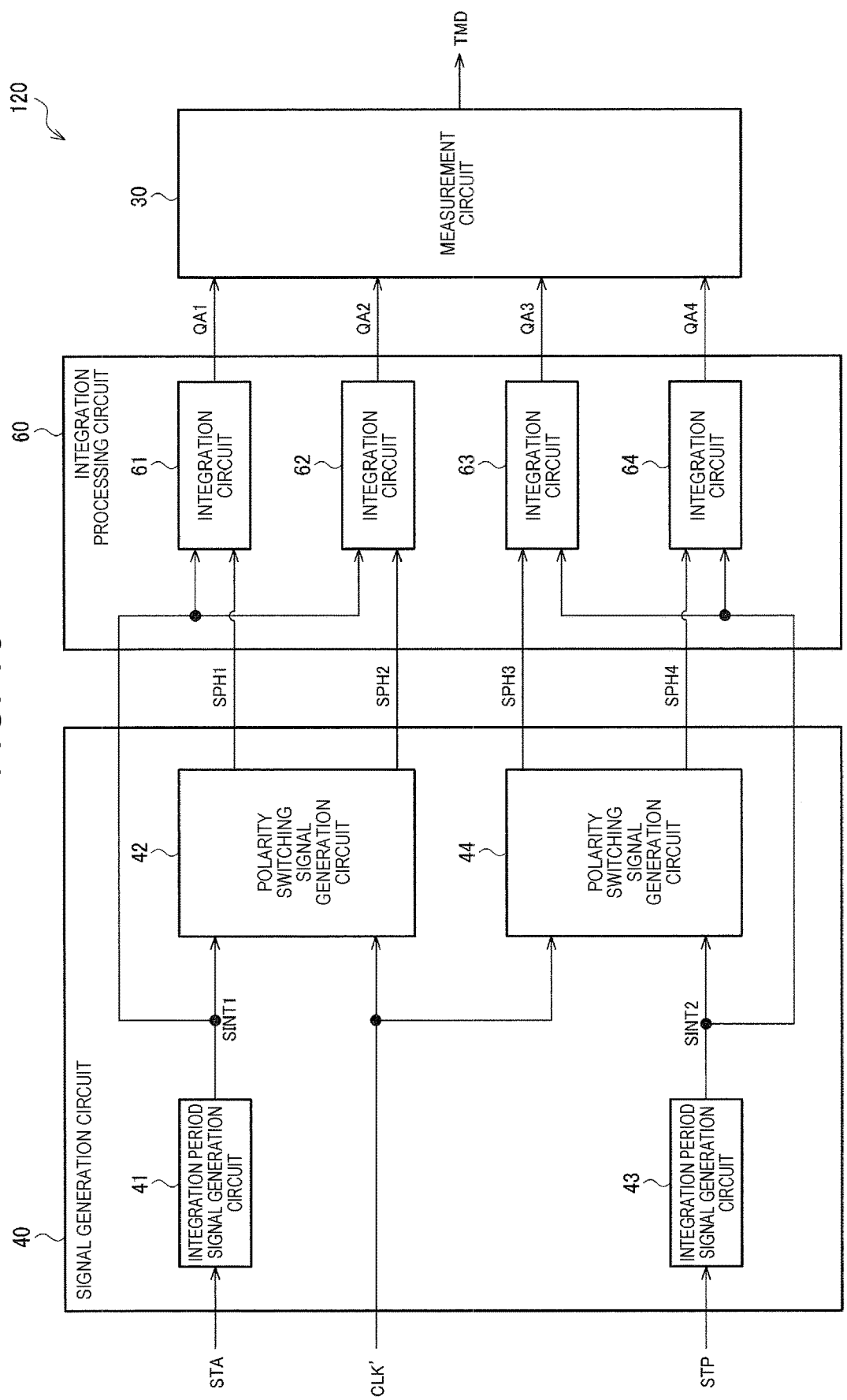
FIG. 13 is a first detailed configuration example of a time-to-digital conversion circuit.

FIG. 13 is a first detailed configuration example of the time-to-digital conversion circuit 120. The time-to-digital conversion circuit 120 includes a measurement circuit 30, a signal generation circuit 40, and an integration processing circuit 60.

The signal generation circuit 40 generates a signal for integration processing based on the first signal STA, the second signal STP, and the clock signal CLK'. In the first detailed configuration example, the clock signal CLK' is used as a reference clock signal which is a reference for time measurement. The signal generation circuit 40 includes integration period signal generation circuits 41 and 43 and polarity switching signal generation circuits 42 and 44.

The integration period signal generation circuit 41 generates a signal SINT1 based on the first signal STA.

The polarity switching signal generation circuit generates signals SPH1 and SPH2 based on the signal SINT1 and the clock signal CLK'. The integration period signal generation circuit 43 generates a signal SINT2 based on the second signal STP. The polarity switching signal generation circuit 44 generates signals SPH3 and SPH4 based on the signal SINT2 and the clock signal CLK'. The signals SINT1 and SINT are integration period signals, and the signals SPH1, SPH2, SPH3, and SPH4 are integration polarity switching signals.

The integration processing circuit 60 performs the integration processing based on the signals SINT1, SPH1, SPH2, SINT2, SPH3, and SPH4 to output voltages QA1 to QA4 that are first to fourth integration values. The voltages QA1 and QA2 indicate phases corresponding to the time difference between the transition timings of the first signal STA and the clock signal CLK'. The voltages QA3 and QA4 indicate phases corresponding to the time difference between the transition timings of the second signal STP and the clock signal CLK'. The integration processing circuit 60 includes integration circuits 61 to 64.

The integration circuit 61 performs first integration processing based on the signals SINT1 and SPH1. The integration circuit 62 performs second integration processing based on the signals SINT1 and SPH2. The integration circuit 63 performs third integration processing based on the signals SINT2 and SPH3. The integration circuit 64 performs fourth integration processing based on the signals SINT2 and SPH4.

The measurement circuit 30 performs an A/D conversion on each of the voltages QA1 to QA4 which are the results of the first to fourth integration processing, and calculates the time difference information TMD from the A/D converted value. The time difference information TMD indicates the time difference between the transition timings of the first signal STA and the second signal STP.

Figure 14:
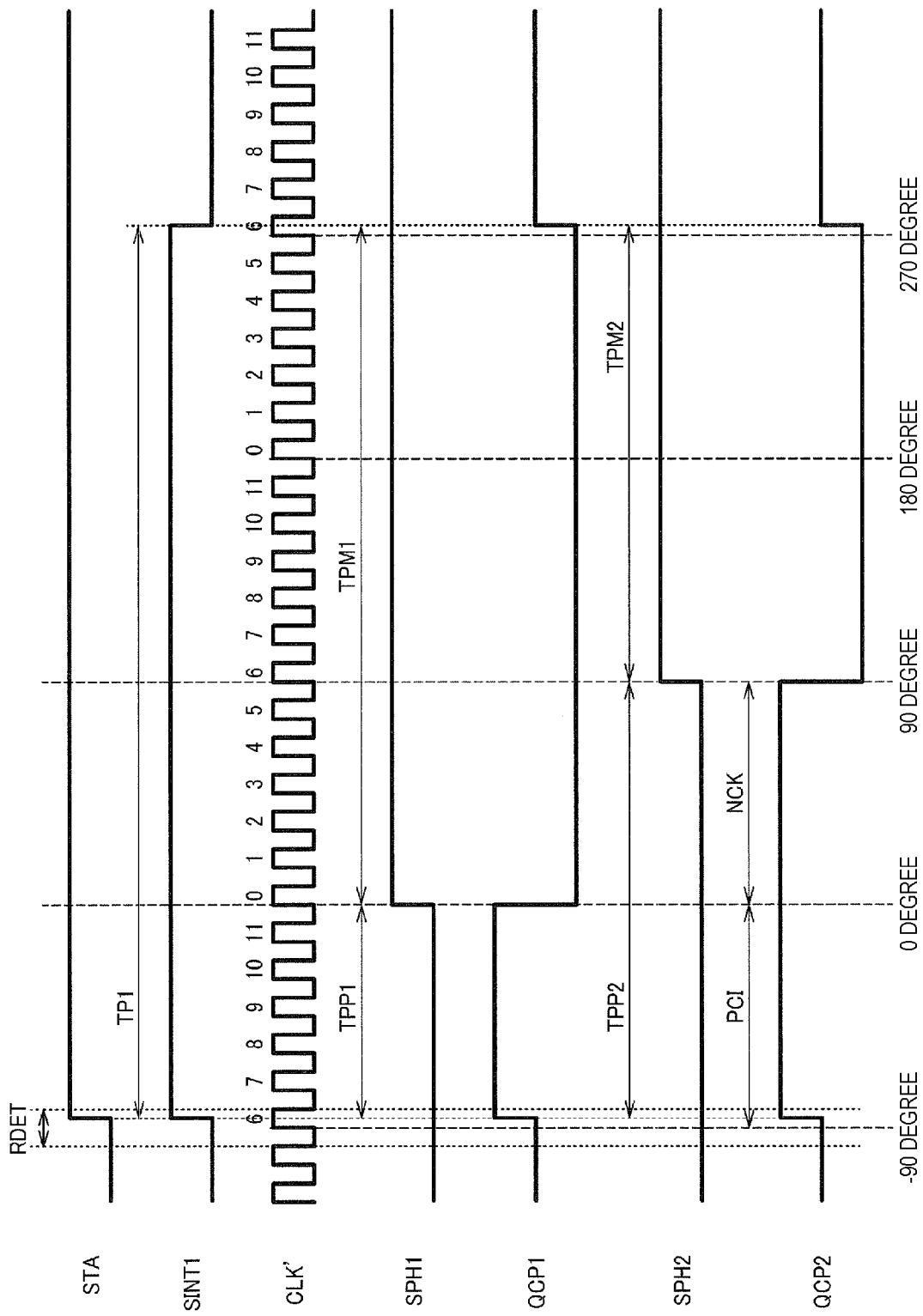
FIG. 14 is a waveform diagram describing an operation of the first detailed configuration example of the time-to-digital conversion circuit.

FIG. 14 is a waveform diagram for describing an operation of the first detailed configuration example of the time-to-digital conversion circuit 120. An operation of obtaining the voltages QA1 and QA2 indicating the phase of the first signal STA will be described as an example.

The integration period signal generation circuit 41 causes the signal SINT1 to transition from the low level to the high level at the transition timing of the first signal STA, maintains the signal SINT1 at the high level in an integration period TP1, and then sets the signal SINT1 to the low level. A length of the integration period TP1 may be four times or more the cycle of the clock signal CLK', and may not be an integral multiple of the cycle of the clock signal CLK'.

A detection range RDET of the phase of the first signal STA corresponds to one cycle of the clock signal CLK'. When the first signal STA transitions, the cycle of the clock signal CLK' to which the transition timing of the first signal STA belongs becomes the detection range RDET.

The polarity switching signal generation circuit 42 causes the signal SPH1 to transition from the low level to the high level at a timing synchronized with the clock signal CLK', in the integration period TP1. A transition timing of the signal SPH1 is synchronized with a rising edge after the number of clocks PCI from the rising edge of the clock signal CLK' in the detection range RDET. The number of clocks PCI may be set randomly. In FIG. 13, PCI=6.

It is assumed that the transition timing of the signal SPH1 is regarded as a phase reference, that is, 0 degree. This corresponds to assuming that the phase of the first signal STA is regarded as 0 degree when the transition timing of the first signal STA matches the rising edge of the clock signal CLK'. In FIG. 14, the length of the integration period TP1 corresponds to 24 cycles of the clock signal CLK'. When the integration period TP1 is regarded as a phase of 360 degrees, one cycle of the clock signal CLK' corresponds to a phase of 15 degrees. Each pulse of the clock signal CLK' in FIG. 14 is numbered with the transition timing of the signal SPH1 as a reference "0". When the number differs by one, the phase differs by 15 degrees.

The polarity switching signal generation circuit 42 causes the signal SPH2 to transition from the low level to the high level after the number of clocks NCK of the clock signal CLK' from the transition timing of the signal SPH1, in the integration period TP1. In FIG. 14, NCK=6, and the phases of the signals SPH1 and SPH2 differ by 90 degrees.

This corresponds to obtaining two integration values with the phase shifted by 90 degrees.

The integration period TP1 is divided into a period TPP1 and a period TPM1 according to the transition timing of the signal SPH1. The integration circuit 61 performs the first integration processing with a first polarity in the period TPP1 and performs the first integration processing with a second polarity, which is a polarity opposite to the first polarity, in the period TPM1. In FIG. 14, the first polarity is positive and the second polarity is negative. The integration circuit 61 outputs the voltage QA1 as the integration result.

The integration period TP1 is divided into a period TPP2 and a period TPM2 according to the transition timing of the signal SPH2. The integration circuit 62 performs the second integration processing with the first polarity in the period TPP2 and the second integration processing with the second polarity in the period TPM2. The integration circuit 62 outputs the voltage QA2 as the integration result.

Although the operation of obtaining the voltages QA1 and QA2 indicating the phase of the first signal STA is described above, the voltages QA3 and QA4 indicating the phase of the second signal STP are also obtained by the same operation.

The time difference between the transition timings of the first signal STA and the second signal STP is set to TDF. The measurement circuit 30 obtains the time difference TDF by TDF=TC×(QA3/AZ2−QA1/AZ1). TC is the cycle of the clock signal CLK', AZ1=QA2−QA1, and AZ2=QA4−QA3. AZ1 and AZ2 are constant regardless of a value of the time difference TDF. In FIG. 14, the integration period TP1 is an unknown number, and offsets due to this unknown number occur in QA1/AZ1 and QA3/AZ2. However, since the integration period TP1 for obtaining QA1 and QA3 is common, the offset of QA1/AZ1 and the offset of QA3/AZ2 have the same value and are canceled by subtraction.

Figure 15:
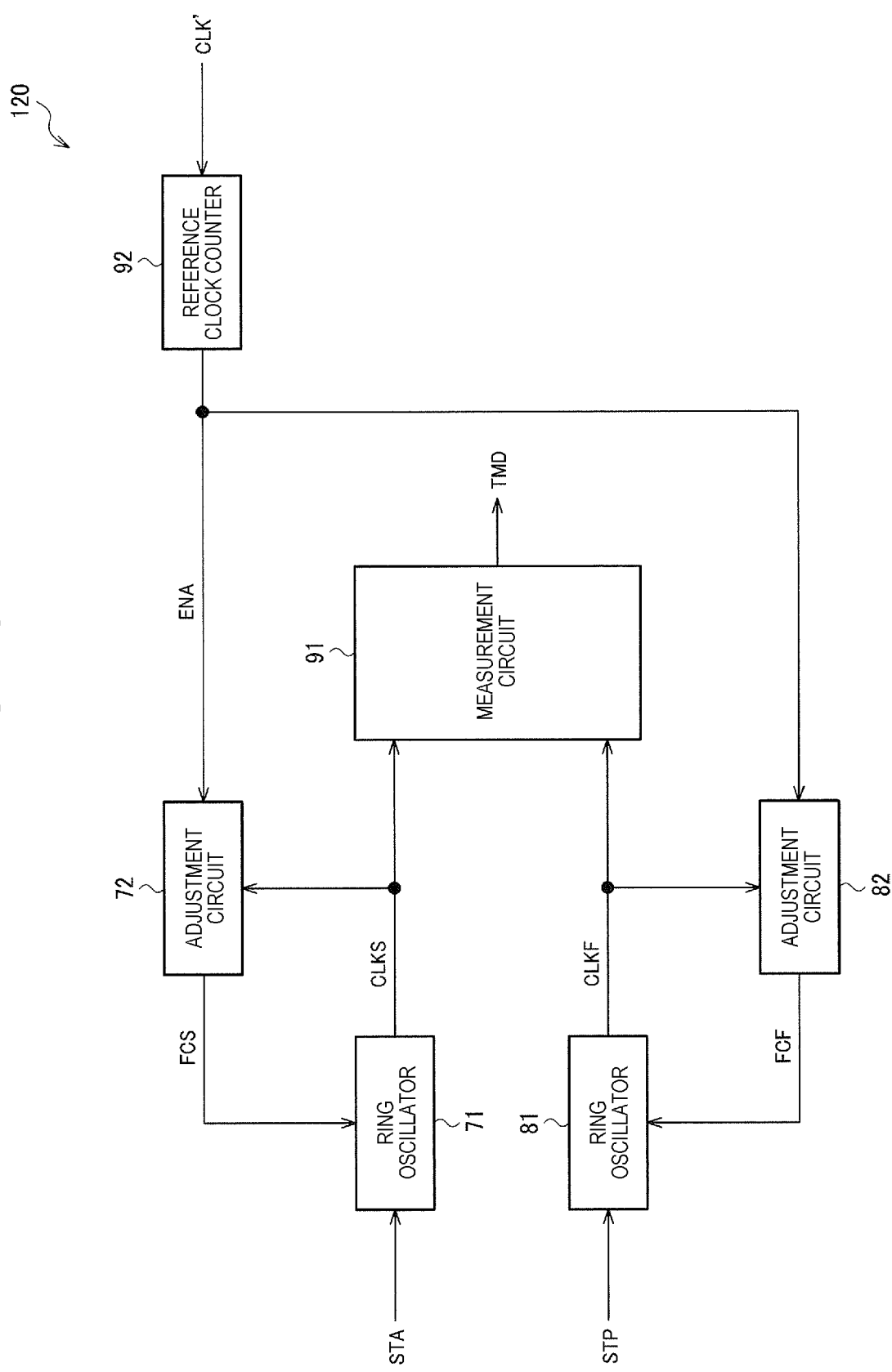
FIG. 15 is a second detailed configuration example of the time-to-digital conversion circuit.

FIG. 15 is a second detailed configuration example of the time-to-digital conversion circuit 120. The time-to-digital conversion circuit 120 includes ring oscillators 71 and 81, a measurement circuit 91, a reference clock counter 92, and adjustment circuits 72 and 82.

In the second configuration example, the time-to-digital conversion circuit 120 has a measurement mode and an adjustment mode. The measurement mode is a mode for measuring the time difference, and the adjustment mode is a mode for adjusting oscillation frequencies of the ring oscillators 71 and 81.

First, the measurement mode will be described. In the ring oscillator 71, an oscillation loop is enabled at the transition timing of the first signal STA. Accordingly, the ring oscillator 71 starts to oscillate and generates a clock signal CLKS. In the ring oscillator 81, the oscillation loop is enabled at the transition timing of the second signal STP. Accordingly, the ring oscillator 81 starts to oscillate and generates a clock signal CLKF. A frequency of the clock signal CLKS is f1 and a frequency of the clock signal CLKF is f2. The frequency f2 is higher than the frequency f1.

The measurement circuit 91 obtains the time difference information TMD based on the clock signal CLKS and the clock signal CLKF. The time difference information TMD indicates the time difference between the transition timings of the first signal STA and the second signal STP. A method of obtaining the time difference information TMD will be described below with reference to FIG. 16.

Next, the adjustment mode will be described. In the second detailed configuration example, the clock signal CLK' is used as a reference clock signal which is a reference for the oscillation frequencies of the ring oscillators 71 and 81. The reference clock counter 92 counts the number of clocks of the clock signal CLK' and outputs an enable signal ENA which becomes active in a period of counting an assigned number of clocks.

The adjustment circuit 72 counts the number of clocks of the clock signal CLKS in the period when the enable signal ENA is active. The adjustment circuit 72 integrates a difference between the count value and a first target value, and outputs control data FCS obtained by the integration. The first target value is a value for setting the oscillation frequency of the ring oscillator 71. The ring oscillator 71 oscillates at an oscillation frequency according to the control data FCS. For example, a variable capacitance circuit is provided as a load of the oscillation loop of the ring oscillator 71, and a capacitance value of the variable capacitance circuit is controlled by the control data FCS. In this manner, the oscillation frequency of the ring oscillator 71 is adjusted.

The adjustment circuit 82 counts the number of clocks of the clock signal CLKF in the period when the enable signal ENA is active. The adjustment circuit 82 integrates a difference between the count value and a second target value, and outputs control data FCF obtained by the integration. The second target value is a value for setting the oscillation frequency of the ring oscillator 81. The ring oscillator 81 oscillates at an oscillation frequency according to the control data FCF. For example, a variable capacitance circuit is provided as a load of the oscillation loop of the ring oscillator 81, and a capacitance value of the variable capacitance circuit is controlled by the control data FCF. In this manner, the oscillation frequency of the ring oscillator 81 is adjusted.

When the time-to-digital conversion circuit 120 is set to the measurement mode after the adjustment mode, the control data FCS and FCF obtained in the adjustment mode is input to the ring oscillators 71 and 81. Accordingly, the ring oscillators 71 and 81 oscillate at the oscillation frequencies adjusted in the adjustment mode, and the measurement circuit 91 can perform the time measurement using the clock signals CLKS and CLKF having accurate frequencies.

Figure 16:
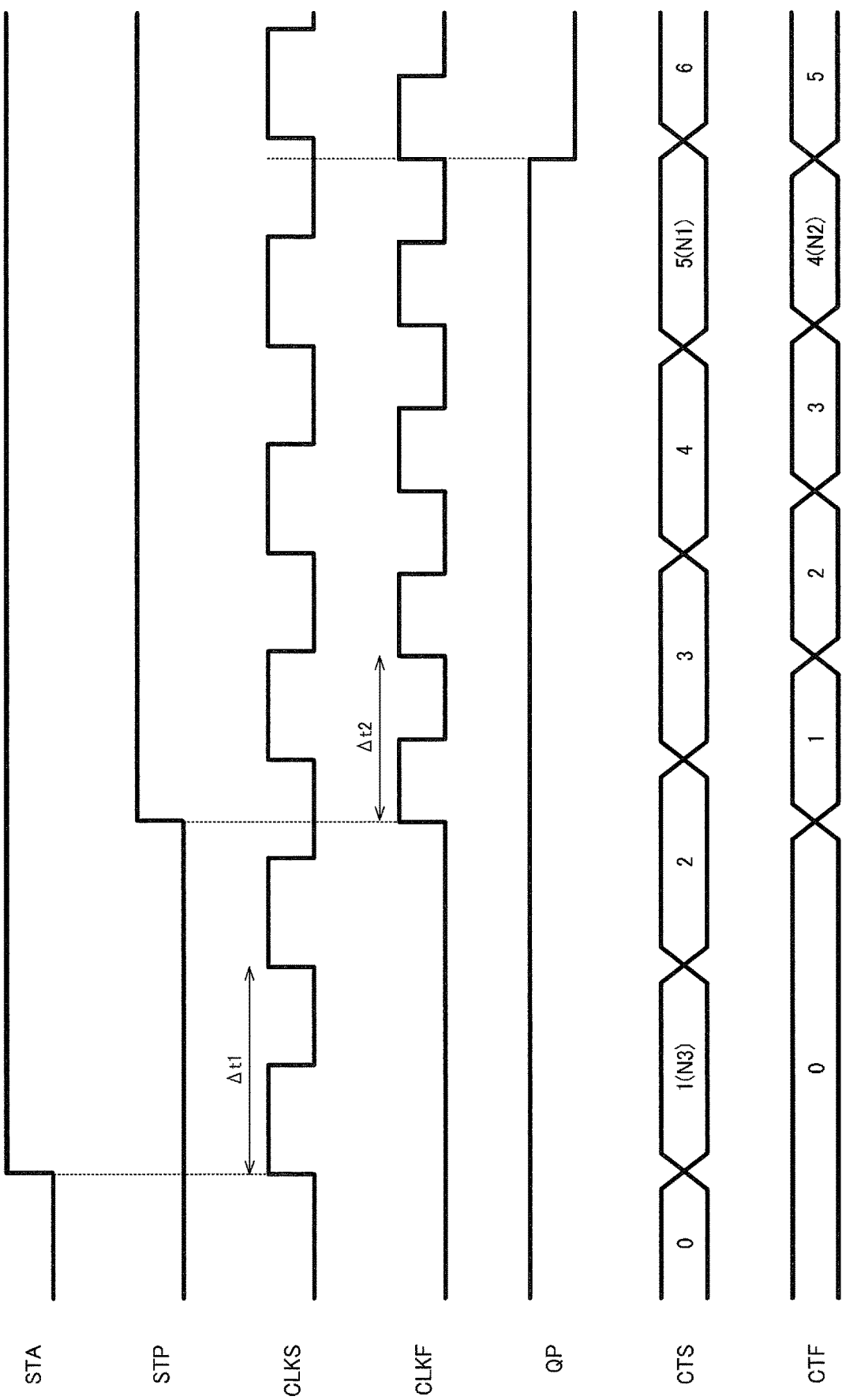
FIG. 16 is a waveform diagram describing an operation of the second detailed configuration example of the time-to-digital conversion circuit.

FIG. 16 is a waveform diagram for describing an operation of the second detailed configuration example of the time-to-digital conversion circuit 120. FIG. 16 shows a waveform diagram in the measurement mode.

The measurement circuit 91 compares phases of the clock signal CLKS and the clock signal CLKF and sets a phase comparison result signal QP from the high level to the low level when the phase of the clock signal CLKS and the phase of the clock signal CLKF are determined to be switched. The phase comparison result signal QP is an internal signal of the measurement circuit 91.

The measurement circuit 91 counts the number of clocks of the clock signal CLKS. This count value is CTS. The measurement circuit 91 counts the number of clocks of the clock signal CLKF. This count value is CTF.

The measurement circuit 91 acquires count values CTS and CTF at a falling edge of the phase comparison result signal QP. The count values are N1 and N2. When a cycle of the clock signal CLKS is $\Delta t1=1/f1$ and a cycle of the clock signal CLKF is $\Delta t2=1/f2$, a difference therebetween is a resolution $\Delta t=|\Delta t1-\Delta t2|$. When N3=N1−N2, the measurement circuit 91 obtains the time difference between the transition timings of the first signal STA and the second signal STP by $N3\times\Delta t1+N2\times\Delta t$. In FIG. 16, since N1=5, N2=4, and N3=1, the time difference is $\Delta t1+4\times\Delta t$.

7. Electronic Apparatus

Figure 17:
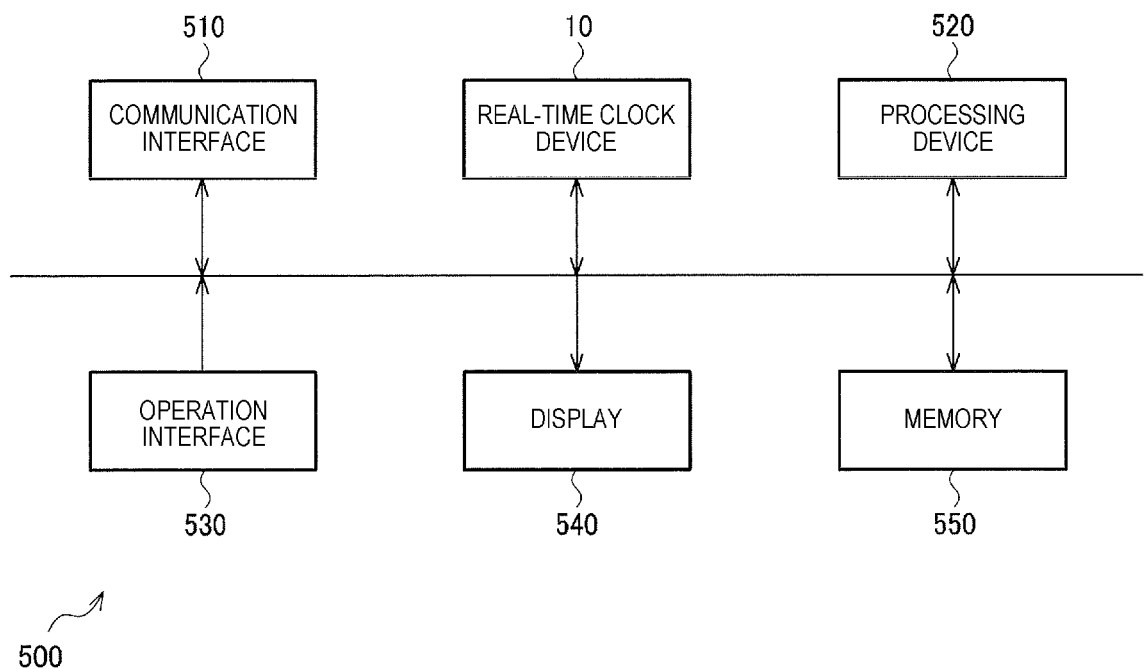
FIG. 17 is a configuration example of an electronic apparatus.

FIG. 17 shows a configuration example of an electronic apparatus 500 including the real-time clock device 10. The electronic apparatus 500 is, for example, a network apparatus, an in-vehicle apparatus, or a measurement apparatus. In the network apparatus or the in-vehicle apparatus, the real-time clock device 10 is used for time synchronization in the system. For example, in a communication network configured of a plurality of network apparatuses, a common time can be used in the network by synchronizing times of real-time clock devices of the network apparatuses. Alternatively, the real-time clock device 10 is used to record a measurement time in the measurement apparatus. Since the real-time clock device 10 of the present exemplary embodiment can obtain highly accurate time information, precise time synchronization or precise measurement time recording is possible.

As shown in FIG. 17, the electronic apparatus 500 includes the real-time clock device 10 and a processing device 520 that performs processing based on an output signal from the real-time clock device 10. The output signal is, for example, time-counting data, time difference information, time data, or frequency information. The processing device 520 may perform signal processing using the output signal from the real-time clock device 10. The electronic apparatus 500 may include a communication interface 510, an operation interface 530, a display 540, and a memory 550. The electronic apparatus 500 is not limited to the configuration of FIG. 17. Various modifications such as omission of some of the components and addition of another component are possible.

The communication interface 510 performs processing of receiving data from the outside and transmitting data to the outside. The processing device 520 performs control processing of the electronic apparatus 500, various types of digital processing of the data transmitted and received through the communication interface 510, or the like. A function of the processing device 520 can be realized by a processor such as a microcomputer. The operation interface 530 is for a user to perform an input operation and can be realized by an operation button, a touch panel display, or the like. The display 540 displays various types of information and can be realized by a display such as a liquid crystal or an organic EL. The memory 550 stores data, and a function of the memory can be realized by a semiconductor memory such as RAM or ROM.

The real-time clock device of the present exemplary embodiment described above includes the resonator, the clock signal generation circuit, the time-counting circuit, the external signal input terminal, and the time-to-digital conversion circuit. The clock signal generation circuit has the oscillation circuit that causes the resonator to oscillate to generate the oscillation clock signal and outputs the time-counting clock signal based on the oscillation clock signal. The time-counting circuit generates the time-counting data based on the time-counting clock signal. The external signal is input to the external signal input terminal. The time-to-digital conversion circuit measures the time difference between the transition timing of the first signal based on the external signal input from the external signal input terminal and the transition timing of the second signal based on the oscillation clock signal or the time-counting clock signal with a resolution higher than the time-counting resolution of the time-counting circuit, and obtains the time difference information corresponding to the time difference.

According to the present exemplary embodiment, since the real-time clock device includes the time-to-digital conversion circuit, it is possible to acquire the time difference information having the resolution higher than the time-counting resolution of the time-counting circuit. That is, the time-counting circuit performs the time-counting by the count processing using the time-counting clock signal, but the time difference information can be acquired without being limited by the time resolution of the count processing. Accordingly, it is possible to realize a highly accurate real-time clock device.

In the present exemplary embodiment, the real-time clock device may include the interface circuit that outputs the output information based on the time-counting data and the time difference information.

According to the present exemplary embodiment, the real-time clock device can output the output information based on the time-counting data and the time difference information to the outside. Accordingly, the processing device provided outside the real-time clock device can use the output information indicating the highly accurate time.

In the present exemplary embodiment, the real-time clock device may include the time data output circuit. The time data output circuit may output the time data with the resolution higher than the time-counting resolution based on the time-counting data and the time difference information. The interface circuit may output the time data as the output information.

According to the present exemplary embodiment, the real-time clock device can output the time data having the resolution higher than the time-counting resolution to the outside. Accordingly, the processing device provided outside the real-time clock device can use the time data having the resolution higher than the time-counting resolution.

In the present exemplary embodiment, the external signal may be the trigger signal. The time data output circuit may output the time data as the time stamp information indicating the transition timing of the trigger signal.

According to the present exemplary embodiment, the real-time clock device can output the time stamp information having the resolution higher than the time-counting resolution to the outside. Accordingly, the processing device provided outside the real-time clock device can use the time stamp information having the resolution higher than the time-counting resolution.

In the present exemplary embodiment, the real-time clock device may include the frequency measurement circuit. The external clock signal may be input as the external signal to the external signal input terminal. The frequency measurement circuit may include the time-to-digital conversion circuit, the counter circuit, and the arithmetic circuit. The counter circuit may perform the count processing based on the external clock signal and the oscillation clock signal, or the external clock signal and the time-counting clock signal, and output the count data. The arithmetic circuit may perform the calculation based on the time difference information and the count data to obtain the frequency information corresponding to the frequency of the external clock signal.

According to the present exemplary embodiment, the real-time clock device includes the frequency measurement circuit, and thus the frequency information of the external clock signal can be acquired. At this time, since the frequency measurement circuit includes the time-to-digital conversion circuit that measures the time difference with the resolution higher than the time-counting resolution, the frequency can be measured with high accuracy using the time difference information. Accordingly, it is possible to realize a highly accurate real-time clock device. For example, the frequency of the time-counting clock signal is adjusted based on the frequency information, and thus highly accurate time-counting becomes possible.

In the present exemplary embodiment, the real-time clock device may include the interface circuit that outputs the time-counting data and the frequency information as the output information.

According to the present exemplary embodiment, the real-time clock device can output the time-counting data and the frequency information to the outside. Accordingly, the processing device provided outside the real-time clock device can use the highly accurate frequency information measured by the frequency measurement circuit including the time-to-digital conversion circuit. For example, the processing device can adjust the frequency of the time-counting clock signal based on the frequency information.

In the present exemplary embodiment, the clock signal generation circuit may output the oscillation clock signal or the divided clock signal of the oscillation clock signal as the time-counting clock signal.

According to the present exemplary embodiment, the time-counting circuit can generate the time-counting data based on the oscillation clock signal or the divided clock signal of the oscillation clock signal.

In the present exemplary embodiment, the clock signal generation circuit may adjust the frequency of the time-counting clock signal based on the frequency adjustment signal input through the interface circuit.

According to the present exemplary embodiment, the frequency of the time-counting clock signal is adjusted based on the frequency adjustment signal input from the outside of the real-time clock device through the interface circuit.

Accordingly, the frequency of the time-counting clock signal can be corrected from the outside, and the real-time clock device can perform the time-counting with high accuracy based on the corrected time-counting clock signal.

In the present exemplary embodiment, the clock signal generation circuit may output the oscillation clock signal or the divided clock signal of the oscillation clock signal as the time-counting clock signal. The oscillation circuit may adjust a frequency of the oscillation clock signal based on the frequency adjustment signal.

According to the present exemplary embodiment, the frequency of the oscillation clock signal is adjusted based on the frequency adjustment signal, and the oscillation clock signal or the divided clock signal of the oscillation clock signal is output as the time-counting clock signal. Accordingly, the frequency adjustment of the time-counting clock signal is realized by the frequency adjustment signal.

In the present exemplary embodiment, the clock signal generation circuit may include the fractional-N type divider circuit that divides the oscillation clock signal and outputs the divided clock signal as the time-counting clock signal. The fractional-N type divider circuit may adjust the division ratio based on the frequency adjustment signal.

According to the present exemplary embodiment, the division ratio of the fractional-N type divider circuit is adjusted based on the frequency adjustment signal, the oscillation clock signal is divided by the division ratio, and the divided clock signal is output as the time-counting clock signal. Accordingly, the frequency adjustment of the time-counting clock signal is realized by the frequency adjustment signal.

In the present exemplary embodiment, the clock signal generation circuit, the time-counting circuit, and the time-to-digital conversion circuit may be provided on one semiconductor substrate.

According to the present exemplary embodiment, it is possible to suppress the delay or waveform deformation of the signal to be measured compared with the case where the clock signal generation circuit, the time-counting circuit, and the time-to-digital conversion circuit are configured as separate ICs. Therefore, the time-to-digital conversion circuit can measure the accurate time difference.

In the present exemplary embodiment, the real-time clock device may include the frequency measurement circuit including the time-to-digital conversion circuit and the processing circuit. The frequency measurement circuit may obtain the frequency information corresponding to the frequency of the time-counting clock signal based on the frequency of the external clock signal input as the external signal. The processing circuit may generate the frequency adjustment signal according to the frequency information. The clock signal generation circuit may adjust the frequency of the time-counting clock signal based on the frequency adjustment signal.

According to the present exemplary embodiment, the real-time clock device can measure the frequency of the time-counting clock signal and adjust the frequency of the time-counting clock signal based on the frequency information. It is not necessary to provide the processing device for performing the signal processing using the frequency information outside the real-time clock device by incorporating the processing circuit in the circuit device. That is, the frequency of the time-counting clock signal can be adjusted by the real-time clock device alone.

In the present exemplary embodiment, the real-time clock device may include the memory that stores the program for the processing circuit to generate the frequency adjustment signal.

According to the present exemplary embodiment, the processing circuit can generate the frequency adjustment signal based on the frequency information by the program stored in the memory. Since the program describing the various pieces of signal processing can be stored in the memory, the user can variously customize a signal processing algorithm for generating the frequency adjustment signal.

The electronic apparatus of the present exemplary embodiment includes the real-time clock device according to any one of the above, and the processing device that performs the processing based on the output signal from the real-time clock device.

Although the present exemplary embodiment is described in detail as described above, it can be easily understood by those skilled in the art that many modifications can be made without substantially departing from the novel matters and effects of the present disclosure. Therefore, all such modification examples are included in the scope of the present disclosure. For example, in the specification or the drawings, a term described at least once together with a different term having a broader meaning or the same meaning can be replaced with the different term in any place in the specification or the drawing. All combinations of the present exemplary embodiment and modification examples are also included in the scope of the present disclosure. The configurations and operations of the circuit device, the real-time clock device, the electronic apparatus, and the like are not limited to those described in the present exemplary embodiment, and various modifications can be made.

What is claimed is:

1. A real-time clock device comprising:
   a resonator;
   a clock signal generation circuit that has an oscillation circuit causing the resonator to oscillate to generate an oscillation clock signal, and that outputs a time-counting clock signal based on the oscillation clock signal;
   a time-counting circuit that generates time-counting data based on the time-counting clock signal;
   an external signal input terminal to which an external signal is input; and
   a time-to-digital conversion circuit that measures a time difference between a transition timing of a first signal based on the external signal input from the external signal input terminal and a transition timing of a second signal based on the oscillation clock signal or the time-counting clock signal with a resolution higher than a time-counting resolution of the time-counting circuit, and obtains time difference information corresponding to the time difference.

2. The real-time clock device according to claim 1, further comprising:
   an interface circuit that outputs output information based on the time-counting data and the time difference information.

3. The real-time clock device according to claim 2, further comprising:
   a time data output circuit that outputs time data having a resolution higher than the time-counting resolution based on the time-counting data and the time difference information,
   wherein the interface circuit outputs the time data as the output information.

4. The real-time clock device according to claim 3,
   wherein the external signal is a trigger signal, and
   the time data output circuit outputs the time data as time stamp information indicating a transition timing of the trigger signal.

5. The real-time clock device according to claim 2, further comprising:
   a frequency measurement circuit including the time-to-digital conversion circuit,
   wherein an external clock signal is input to the external signal input terminal as the external signal, and
   the frequency measurement circuit includes
   a counter circuit that performs count processing based on the external clock signal and the oscillation clock signal, or the external clock signal and the time-counting clock signal, and outputs count data, and
   an arithmetic circuit that performs a calculation based on the time difference information and the count data to obtain frequency information corresponding to a frequency of the external clock signal.

6. The real-time clock device according to claim 5, further comprising:
   an interface circuit that outputs the time-counting data and the frequency information as output information.

7. The real-time clock device according to claim 5,
   wherein the clock signal generation circuit outputs the oscillation clock signal or a divided clock signal of the oscillation clock signal as the time-counting clock signal.

8. The real-time clock device according to claim 5,
   wherein the clock signal generation circuit adjusts a frequency of the time-counting clock signal based on a frequency adjustment signal input through the interface circuit.

9. The real-time clock device according to claim 8,
   wherein the clock signal generation circuit outputs the oscillation clock signal or a divided clock signal of the oscillation clock signal as the time-counting clock signal, and
   the oscillation circuit adjusts a frequency of the oscillation clock signal based on the frequency adjustment signal.

10. The real-time clock device according to claim 8,
    wherein the clock signal generation circuit includes a fractional-N type divider circuit that divides the oscillation clock signal and outputs the divided clock signal as the time-counting clock signal, and
    the fractional-N type divider circuit adjusts a division ratio based on the frequency adjustment signal.

11. The real-time clock device according to claim 1,
    wherein the clock signal generation circuit, the time-counting circuit, and the time-to-digital conversion circuit are provided on one semiconductor substrate.

12. The real-time clock device according to claim 1, further comprising:
    a frequency measurement circuit including the time-to-digital conversion circuit; and
    a processing circuit,
    wherein the frequency measurement circuit obtains frequency information corresponding to a frequency of the time-counting clock signal based on a frequency of an external clock signal input as the external signal,
    the processing circuit generates a frequency adjustment signal according to the frequency information, and
    the clock signal generation circuit adjusts a frequency of the time-counting clock signal based on the frequency adjustment signal.

13. The real-time clock device according to claim 12,
    wherein the processing circuit includes a memory that stores a program for generating the frequency adjustment signal.

14. An electronic apparatus comprising:
    the real-time clock device according to claim 1; and
    a processing device that performs processing based on an output signal from the real-time clock device.

* * * * *